US008016236B2

(12) United States Patent
Grieve et al.

(10) Patent No.: US 8,016,236 B2
(45) Date of Patent: Sep. 13, 2011

(54) METHOD AND APPARATUS FOR ATTACHING A WING TO A BODY

(75) Inventors: James C. Grieve, Arlington, WA (US); Francis A. Andrews, Everett, WA (US); Marcus A. Erickson, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 865 days.

(21) Appl. No.: 11/696,482

(22) Filed: Apr. 4, 2007

(65) Prior Publication Data
US 2008/0283666 A1   Nov. 20, 2008

(51) Int. Cl.
*B64C 1/26* (2006.01)
(52) U.S. Cl. ........................ 244/131; 244/119; 244/123.1
(58) Field of Classification Search .................. 244/131, 244/119, 129.1, 117 R, 124, 38, 123.1, 120
See application file for complete search history.

(56) References Cited

U.S. PATENT DOCUMENTS

| 849,971 | A | * | 4/1907 | Brandi | 244/64 |
| 1,840,901 | A | * | 1/1932 | Hicks | 244/131 |
| 2,211,089 | A | * | 8/1940 | Berlin | 244/131 |
| 3,942,746 | A | * | 3/1976 | Carter et al. | 244/36 |
| 4,120,998 | A | * | 10/1978 | Olez | 244/131 |
| 4,417,708 | A | * | 11/1983 | Negri | 244/131 |
| 4,869,443 | A | * | 9/1989 | Skow | 244/119 |
| 5,332,178 | A | * | 7/1994 | Williams | 244/117 R |
| 5,924,649 | A | * | 7/1999 | Piening et al. | 244/131 |

FOREIGN PATENT DOCUMENTS

| FR | 2915173 A1 | * | 10/2008 |
| RU | 2154003 C2 | * | 8/2000 |

OTHER PUBLICATIONS

U.S. Appl. No. 11/522,018, filed Sep. 15, 2006, Estell et al.

* cited by examiner

*Primary Examiner* — Tien Dinh
*Assistant Examiner* — Richard R Green
(74) *Attorney, Agent, or Firm* — Yee & Associates, P.C.; Brett L. Halperin

(57) ABSTRACT

A method and apparatus for assembling an aircraft. A wing spar fitting is connected to a spar in a wing for the aircraft. A body frame fitting is connected to a frame in a body for the aircraft. The locations and orientations of the body frame fitting and the wing spar fitting allow for the body frame fitting to be attached to the wing spar fitting when the wing is positioned for attachment to the body of the aircraft. The wing is positioned with respect to the body of the aircraft for attachment to the body. The body frame fitting and the wing spar fitting are attached to each other with a set of fasteners after the body frame fitting is aligned to the wing spar fitting without penetrating any sealed areas in the wing, wherein the wing is attached to the body by a mechanical joint that is formed by the body frame fitting and the wing spar fitting.

20 Claims, 22 Drawing Sheets

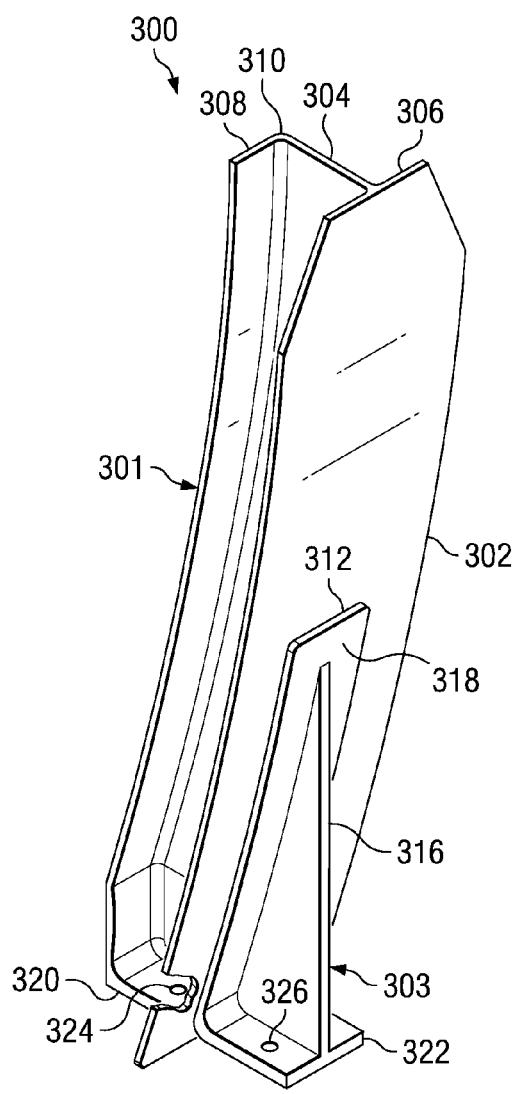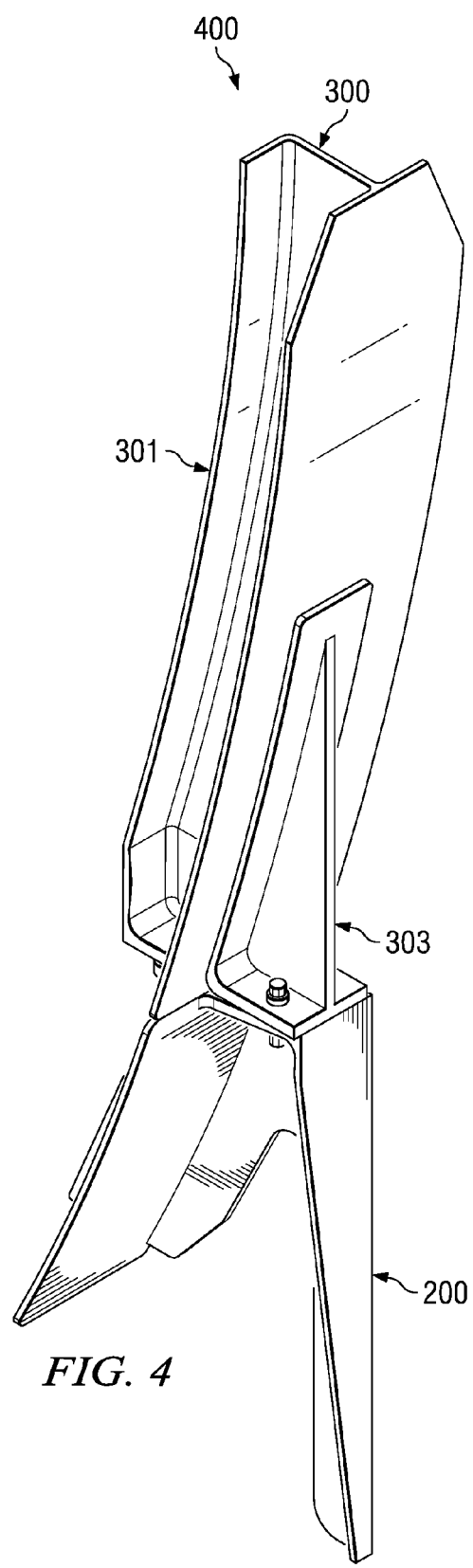
FIG. 3
FIG. 4

METHOD AND APPARATUS FOR ATTACHING A WING TO A BODY

BACKGROUND INFORMATION

1. Field

The present invention relates generally to aircraft and more particularly to attaching wings of an aircraft to a body for the aircraft.

2. Background

Final assembly of large aircraft is a complex procedure. The aircraft components are very expensive and have high inventory holding expenses. Further, the aircraft structural joints for attaching wings to a body are required to carry large loads. It is desirable to be able to quickly put together the different components of the aircraft to reduce the amount of time that different components are present in inventory. Thus, it is desirable to quickly assemble components with structural joints that are robust and reliable.

Currently, each major component, such as a wing or body, cannot be fully preassembled before final assembly of the aircraft to increase efficiency. This type of assembly of components allows for inspections and functional testing to be completed at the sub-assembly level. This type of testing includes, for example, leak testing of wing fuel tanks. When the testing of a component occurs before assembling the component with other components, any results that may require changes or replacement of parts can be preformed without disrupting the sequence in which the aircraft is assembled. This type of process saves time and reduces costs.

In attaching a wing to a body, older aircraft use one large pin for the front wing spar to body frame joint. This type of assembly facilitates quick assembly during manufacturing. This older approach, however, contributes to the weight of the aircraft. Although the use of a large pin for the wing front spar to body frame joint allows for preassembly of sub-assemblies and testing of those sub-assemblies prior to assembly, this approach has been changed in the current assembly processes used for aircraft to reduce the amount of weight.

Current manufacturing processes for aircraft attach the wings to the body using complex wing front spar to body frame joints. For example, wing front spar to body frame joints that use shear fasteners reduce the weight as compared to using a single pin joint. These types of joints, however, take considerable time to assemble and do not allow for functional testing of sub-assemblies, such as the fuel tanks in the wing, prior to final assembly. These types of joints incorporate many shear fasteners. These shear fasteners reduce wing weight as compared to using a pin. Further, shear fasteners efficiently carry flight loads between the wing and body.

This type of assembly process does not allow for complete assembly, preassembly and testing sub-assemblies, which results in additional work being performed in the final assembly. The attachment of the structural shear fasteners results in pressure areas or boundaries in the body or the wing being penetrated. For example, the fuel tank in the wing may be penetrated during this process. This approach is more expensive and disruptive if components fail tests in the completed aircraft. A result of this current approach is that the final fuel tank seal completion occurs late in the aircraft manufacturing cycle. Currently, the sealing of the fuel tanks are not completed when the wing is assembled. Instead, local portions of the fuel tanks are sealed during the wing-to-body assembly. Testing is then performed on the fuel tanks after the wings have been attached to the body. This sealing happens in the wing-to-body assembly because the shear fasteners are not attached until the assembly. The attachment of these fasteners could penetrate the fuel tanks within the wing. If problems are detected by the testing that require changing parts or modifying parts to properly seal the fuel tanks, the assembly process is interrupted to correct the problem.

As a result, other processes in assembling the aircraft may be delayed until the fuel tank is properly sealed. This situation results in increased time and costs needed to assemble the aircraft.

SUMMARY

The advantageous embodiments of the present invention provide a method and apparatus for assembling an aircraft. A wing spar fitting is connected to a spar in a wing for the aircraft. A body frame fitting is connected to a frame in a body for the aircraft. The locations and orientations of the body frame fitting and the wing spar fitting allow for the body frame fitting to be attached to the wing spar fitting when the wing is positioned for attachment to the body of the aircraft. The wing is positioned with respect to the body of the aircraft for attachment to the body. The body frame fitting and the wing spar fitting are attached to each other with a set of fasteners after the body frame fitting is aligned to the wing spar fitting without penetrating any sealed areas in the wing, wherein the wing is attached to the body by a mechanical joint that is formed by the body frame fitting and the wing spar fitting.

In another advantageous embodiment, a wing for the aircraft is positioned for attachment to a body of the aircraft. A first fitting connected to a first structural component in a wing for the aircraft is attached to a second fitting connected to a second structural component in the body for the aircraft with a set of fasteners after the wing is position with respect to the body without penetrating any pressure or fluid boundaries or sealed areas in the wing. The first fitting and the second fitting form a mechanical joint connecting the wing to the body.

An apparatus of another embodiment has a body fitting, wherein the body fitting has a first section designed for attachment to a frame in a body of an aircraft prior to attaching the body to a wing of the aircraft, a second section extending from the first section in which the second section has a set of holes. The apparatus also includes a wing fitting, wherein the wing fitting has a first section designed for attachment to a spar in the wing of the aircraft prior to attaching the body to a wing of the aircraft and a second section extending from the first section in which the second section has a set of holes and is designed to be connected to the second section of the body fitting. The body fitting and the wing fitting are connected using a set of fasteners in which the set of fasteners are placed through the set of holes in the second section of the body fitting and the set of holes in the second section of the wing fitting to connect the body fitting to the wing fitting and form a mechanical joint.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIG. 3 is a portion of a mechanical joint in accordance with an advantageous embodiment of the present invention;

FIG. 4 is a diagram illustrating a mechanical joint in accordance with an advantageous embodiment of the present invention;

DETAILED DESCRIPTION

Figure 1:
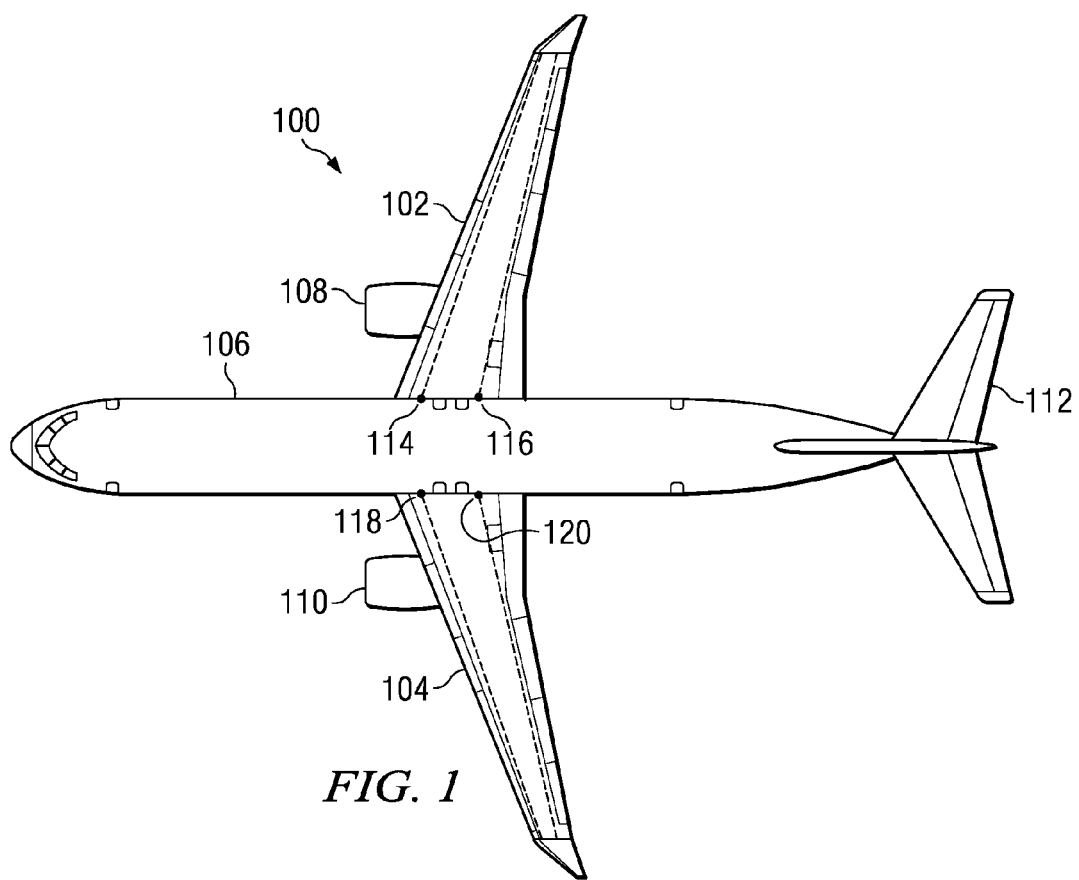
FIG. 1 is a diagram of an aircraft in which an advantageous embodiment the present invention may be implemented.

With reference now to the figures, and in particular, with reference to FIG. 1, a diagram of an aircraft is depicted in which an advantageous embodiment the present invention may be implemented. Aircraft 100 is an example of an aircraft in which a method and apparatus for attaching a wing to a body may be implemented. In this illustrative example, aircraft 100 has wings 102 and 104 attached to body 106. Aircraft 100 includes wing mounted engine 108, wing mounted engine 110, and tail 112.

In particular, the different advantageous embodiments may be used to connect structural components in wings 102 and 104 to structural components in body 106. For example, the different advantageous embodiments may be used in wing spar to body joints which may be located at points 114, 116, 118, and 120. These wing spar to body joints are used to attach the wing spars for wings 102 and 104 to a structural component in body 106.

Wing spars are structural components that are used to form wings 102 and 104. In particular, ribs are attached to these wing spars. A spar is a main structural member of the wing. A spar runs length wise across the span of the wing and is typically around or about a right angle to the body or fuselage. Upper and lower wing skins form the aerodynamic surfaces and are separated by the spars. Together the spars, ribs and skins form the wing box, which typically carries the majority of the forces of both lift and the weight of the wings when the aircraft is on the ground. Other structural and forming members such as ribs are attached to a spar.

The different advantageous embodiments of the present invention provide a method and apparatus for assembling an aircraft. In particular, a wing is connected to a body with a mechanical joint that does not require penetration of a wing fluid boundary within the aircraft, while facilitating a greater level of completion of the body structure prior to joining. In the illustrative examples, the mechanical joint employed does not require the penetration of a sealed area or boundary. A sealed area may be a pressure area or an area that contains fluids. A pressure boundary may be a boundary for a pressure area or area that contains fluids. In the illustrative embodiments, a wing spar fitting is connected to a spar in a wing for an aircraft and a body frame fitting is connected to a frame and structural skin in a body for the aircraft. The location and orientation of these fittings are such that the body frame fitting may be attached or connected to the wing spar fitting when the wing is put into place for connection to the body of the aircraft. The wing is then positioned with respect to the body for attachment to the body in which the body frame fitting is aligned to the wing spar fitting in a manner that allows for the body frame fitting to be attached to the wing spar fitting.

Thereafter, the body frame fitting is attached to the wing spar fitting with a discrete set of fasteners after the body frame fitting is aligned to the wing spar fitting. In the illustrative examples below, these fasteners are tension bolts. This attachment may occur without penetrating fluid or pressure areas or boundaries in the wing and body with the wing being attached to the body through a mechanical joint formed by the body frame fitting and the wing spar fitting.

Figure 2:
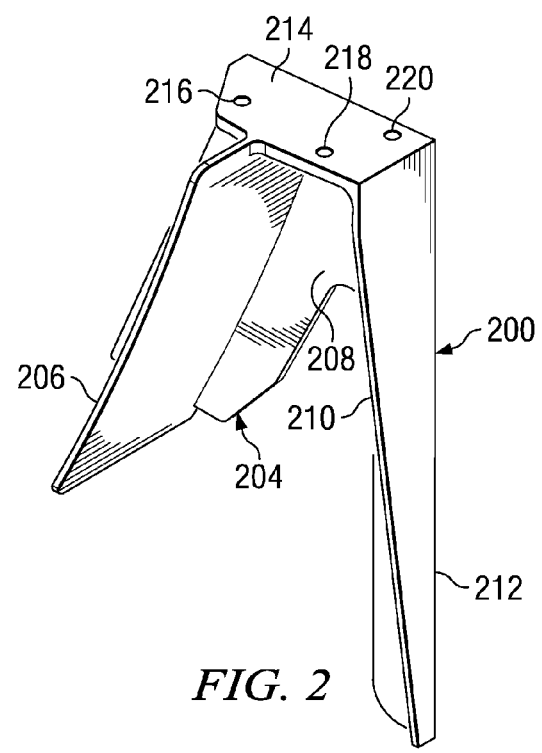
FIG. 2 is a diagram of a portion of a mechanical joint in accordance with an advantageous embodiment of the present invention.

Turning now to FIG. 2, a diagram of a portion of a mechanical joint is depicted in accordance with an advantageous embodiment of the present invention. In this example, wing spar fitting 200 is an example of a fitting that is attached to a wing spar in a wing, such as wing 104 in FIG. 1. This fitting is a tension fitting. In these examples, section 204 is a planer section that may be attached to a wing spar. Section 206 extends from surface 208 of section 204 and flange 210 extends from edge 212 of section 204. These two components extend from section 204 in a direction that is about perpendicular to surface 208 of section 204. Wing spar fitting 200 has connector section 214 which extends from section 204 and integrates with sections 208 and flange 210. Connector section 214 includes holes 216, 218, and 220 in these examples. These holes in these advantageous embodiments are tension bolt holes, which are used to receive tension bolts to connect wing spar fitting 200 to another fitting.

Turning now to FIG. 3, a portion of a mechanical joint is depicted in accordance with an advantageous embodiment of the present invention. Body frame fitting 300 is an example of a fitting that may be attached to wing spar fitting 200 in FIG. 2. Body frame fitting 300 includes two parts in this example, part 301 and part 303. In this illustrative embodiment, part 301 is attached to a body or other structural component in the body of an aircraft. Part 303 is attached to part 301 in which a body panel may be located between part 301 and part 303. Depending on the particular implementation, part 303 is an optional component and may not be needed.

In this illustrative example, body frame fitting 300 includes section 302. Section 304 extends from surface 306 of section 302. Section 304 is about or approximately perpendicular to surface 306 in section 302. Section 304 also includes flange 308. Flange 308 extends in a direction that is about perpendicular from edge 310 of section 304.

Component 303 in body frame fitting 300 includes section 312. Section 312 also includes section 316, which extends from surface 318 of section 312. Body frame fitting 300 also includes connector section 320 and connector section 322. These connector sections are used to connect body frame fitting 300 to another fitting, such as wing spar fitting 200 in FIG. 2. Section 320 includes hole 324 and section 322 includes hole 326. Section 322 also includes another hole, which is hidden from view by section 316.

Turning now to FIG. 4, a diagram illustrating a mechanical joint is depicted in accordance with an advantageous embodiment of the present invention. Wing and body fitting 400 is a mechanical joint formed from placing wing spar fitting 200 in FIG. 2 adjacent to body frame fitting 300 in FIG. 3. These two fittings are connected or attached to each other by fasteners, such as tension bolts, placed in the holes found within each of the fittings.

Wing spar fitting 200 and body frame fitting 300 may be formed from different materials. For example, aluminum, titanium, or composite materials may be used. Composite materials may include, for example, graphite combined with epoxy resin, titanium, and other graphite composites. Carbon fiber reinforced polymer (CFRP) is another example of a composite that may be used. In these examples, the fittings are typically formed using aluminum when an aluminum frame or aluminum components are used. Titanium may be used when composite materials are employed. Also, depending on the implementation, composite or other materials may be used, as desired, to meet various performance and safety requirements. Further, wing spar fitting 200 may be made from a different material from body frame fitting 300 depending on the implementation. Also, part 301 and part 303 may be made using different materials in different embodiments.

Figure 5:
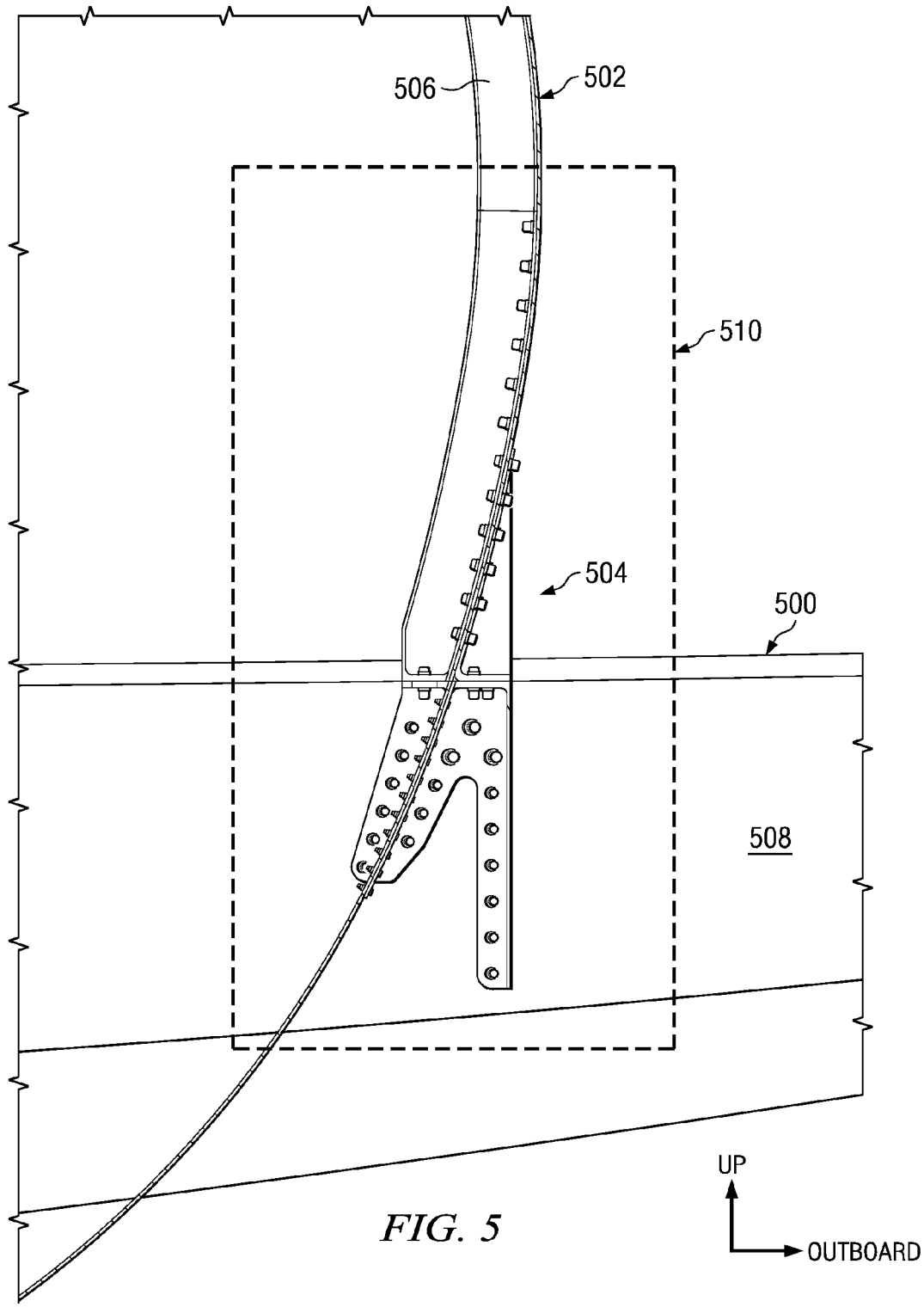
FIG. 5 is a diagram of a front view of a mechanical joint used to attach a wing to a body in accordance with an advantageous embodiment of the present invention.

Turning now to FIG. 5, a diagram of a front view of a mechanical joint used to attach a wing to a body is depicted in accordance with an advantageous embodiment of the present invention. In this example, wing 500 is attached to body 502 through a mechanical joint in the form of wing spar to body fitting 504. Body 502 is similar to body 106 in FIG. 1, and wing 500 is similar to wing 104 in FIG. 1. In this example, body 502 is a completed body and wing 500 is a completed wing.

Wing spar to body fitting 504 may be used to attach bulkhead frame 506 in body 502 to wing spar 508 in wing 500. A bulkhead frame is a structural component designed to react high interface loads and/or to splice body sections together. In this example, the body frame fitting forms the bottom portion of the body bulkhead.

Wing spar to body fitting 504 is created using a mechanical joint, such as wing spar to body fitting 400 in FIG. 4. Although in this example, this joint is created between bulkhead frame 506 and wing spar 508. This type of joint may be created between other structural components in body 502 and wing 500 depending on the particular implementation. For example, the joints may be used at load carrying structural components.

Figure 6:
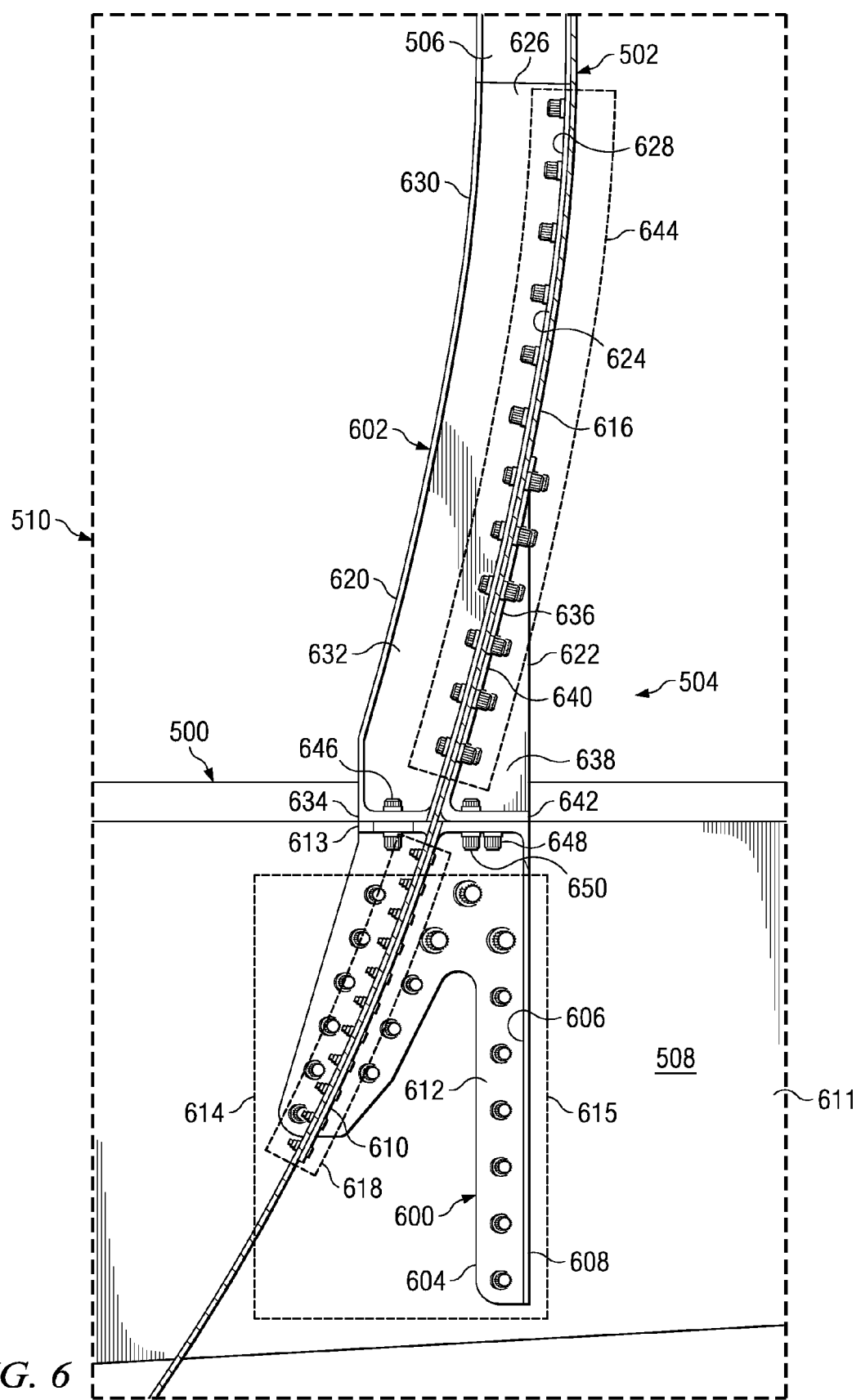
FIG. 6 is a more detailed illustration of a wing spar to body fitting used to attach a wing spar to body in accordance with an advantageous embodiment of the present invention.

Turning now to FIG. 6, a more detailed illustration of a wing spar to body fitting used to attach a wing spar to body is depicted in accordance with an advantageous embodiment of the present invention. The illustration of wing spar to body fitting 504 in FIG. 6 is a more detailed view of those components from section 510 in FIG. 5. As can be seen in this more detailed example, wing spar to body joint 504 includes wing spar fitting 600 and body frame fitting 602.

In this example, section 604 in wing spar fitting 600 is attached to wing spar 508. Flange 606 extends from edge 608 in section 604. Section 610 extends from surface 612 of section 604. Both flange 606 and section 610 extend from section 604 in a direction that is about perpendicular to surface 612 in section 604. Section 604 also includes connector section 613. This section extends from section 604 in a direction that is about perpendicular to surface 612. Connector section 613 and flange 606 are a continuous part of wing spar fitting 600 in this example. Connector section 613 is formed with a thicker width to provide for connection to body frame fitting 602 in these depicted examples.

Section 604 is connected to surface 611 of wing spar 508 through fasteners in the area enclosed by dotted lines 614 and 615. Section 610 is attached to body panel 616 in body 502 through fasteners located in the section within dotted line 618 after wing and body are joined.

Body frame fitting 602 is an example of a body frame fitting, such as body frame fitting 300 in FIG. 3. In this example, body frame fitting 602 contains two parts, part 620 and part 622. Part 620 includes section 624. Section 626 extends from surface 628 of section 624. Section 626 extends in a direction that is about perpendicular to surface 628. Flange 630 extends from the edge of section 626. Flange 630 extends in a direction that is about perpendicular to surface 632 in section 626. Additionally, connector section 634 extends from surface 632 in a direction that is about perpendicular to surface 632. Connector section 634 and flange 630 form a continuous flange extending from section 626. Connector section 634 is thicker relative to flange 630 and is designed to provide strength for the mechanical joint in these examples.

Part 622 includes section 636 with section 638 extending in a direction that is about perpendicular to surface 640 of section 636. Additionally, part 622 also includes connector section 642 which is connected to section 638 and section 636.

Part 620 and part 622 are connected to body panel 616 with body panel 616 being located between parts 620 and 622 in these examples. Depending on the particular implementation, body frame fitting 602 may only be comprised of a single component, such as part 620. A single component is more often used when the curvature of body panel 616 is slight or non existent. In these examples, such a curvature is found in a larger aircraft, while a smaller radius curvature is typically found in a smaller aircraft.

Part 620 is attached to bulkhead frame 506 in these examples. The attachment of these two components, parts 620 and bulkhead frame 506, may be made using a number of different mechanisms, such as a split plate (not shown). Part 620 and part 622 in body frame fitting 602 are attached to body panel 616 using fasteners, such as those enclosed by dotted line 644.

In the depicted examples, fasteners 646, 648, and 650 are used to connect body frame fitting 602 to wing spar fitting 600. In these examples, the different fasteners illustrated take the form of bolts. In particular, fasteners 646, 648, and 650 are tension bolts, in these illustrative examples, that are designed to carry the load of the wing.

In these illustrative examples, body frame fitting 602 is attached to bulkhead frame 506 in body 502 prior to connecting wing 500 to body 502. In a similar fashion, wing spar fitting 600 is attached to wing spar 508 in wing 500 prior to wing 500 being attached to body 502. The attachment of wing 500 to body 502 is made through attaching body frame fitting 602 to wing spar fitting 600 through the use of fasteners 646, 648, and 650. This connection does not require the penetration of any fluid or pressure areas or boundaries within body 502 or wing 500.

In this particular advantageous embodiment, section 610 is attached to body panel 616 as part of completing the close-out of the body pressure boundary. A pressure area is an area that may be pressurized. A pressure boundary is a boundary for a pressure area. Any process that penetrates a boundary for a sealed area will require testing and possibly additional work. The different advantageous embodiments are designed to allow for the attachment of a wing to a body through the use of mechanical joints that do not require the penetration of any of these types of sealed areas or boundaries.

Consequently, additional testing, possible additional work, and the time needed for the testing of work is not required with this type of mechanical joint. Further, this type of mechanical joint formed using wing spar to body fitting 504 also allows for a reduction in weight as compared to the prior use of a large pin to create the joint. Additionally, this type of method and apparatus also provides the advantage of not requiring additional steps or disruptions that occur when a sealed area or boundary is penetrated in the process of creating a joint to connect a wing to a body of an aircraft.

Figure 7:
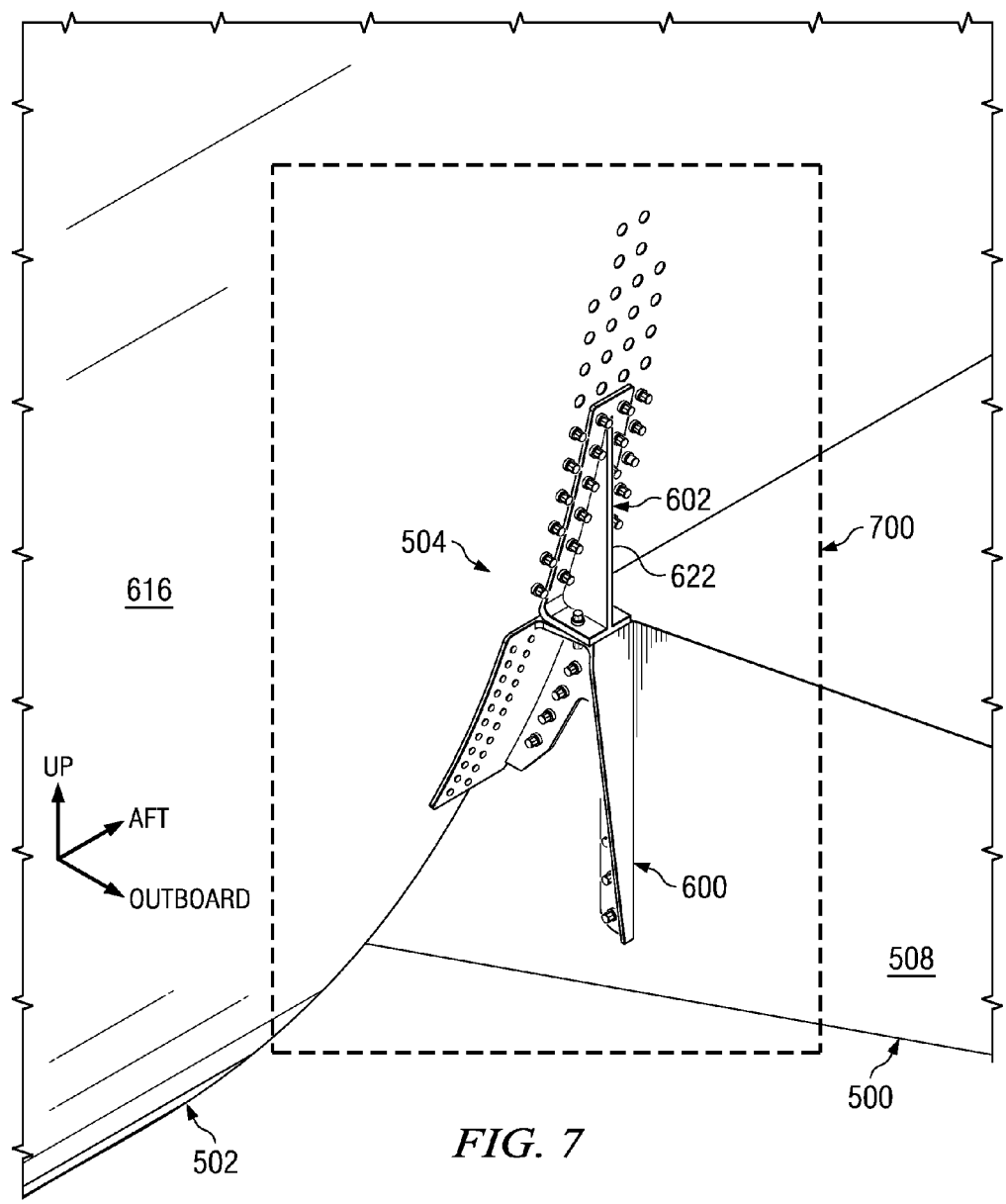
FIG. 7 is a diagram illustrating a left isometric view of the mechanical joint in FIG. 5 in accordance with an advantageous embodiment of the present invention.

Turning now to FIG. 7, a diagram illustrating a left isometric view of the mechanical joint in FIG. 5 is depicted in accordance with an advantageous embodiment of the present invention. In this particular view, only part 622 of body frame fitting 602 is visible.

Figure 8:
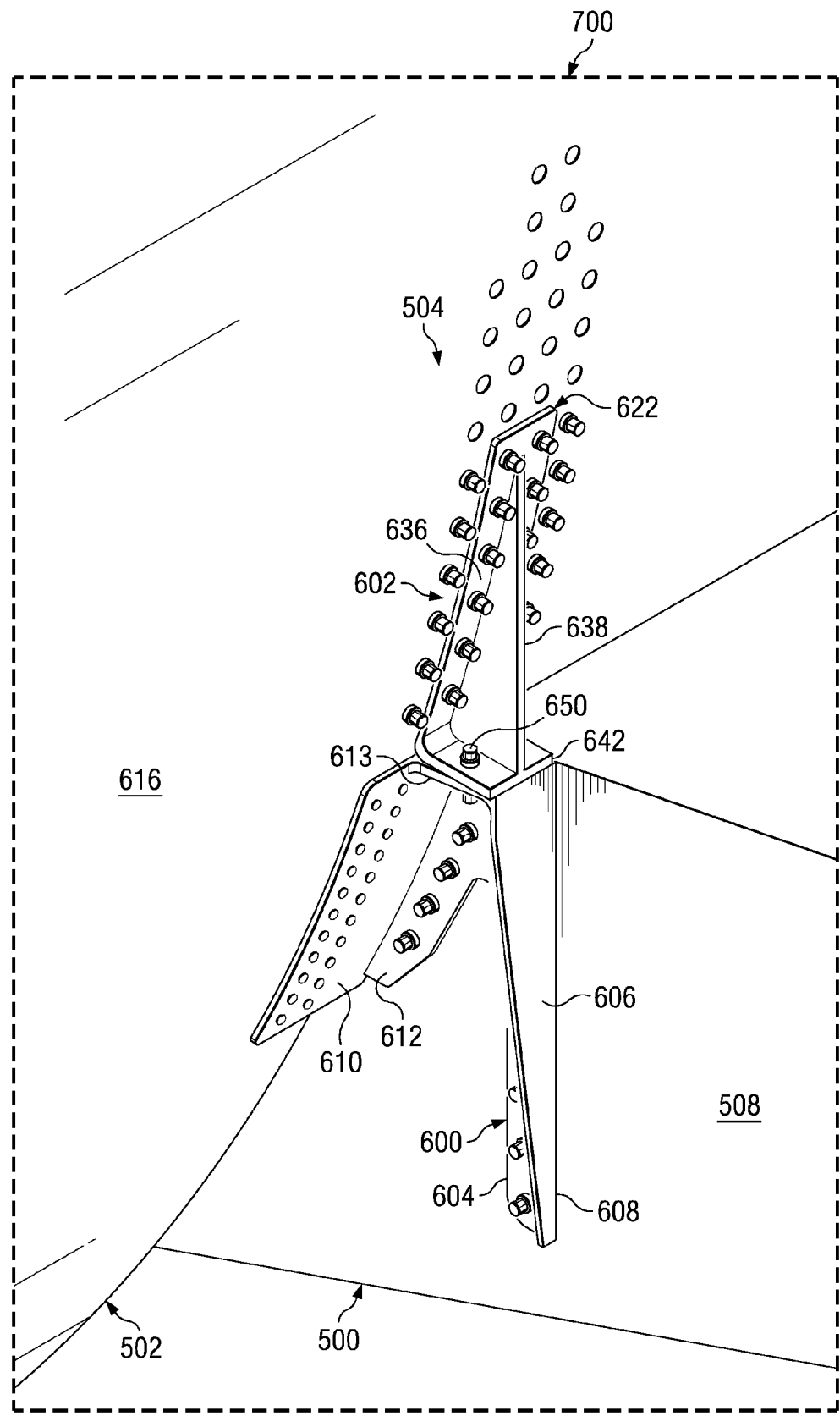
FIG. 8 is a more detailed view of the mechanical joint in FIG. 7 in accordance with an advantageous embodiment of the present invention.

Turning now to FIG. 8, a more detailed view of the mechanical joint in FIG. 7 is depicted in accordance with an advantageous embodiment of the present invention. In this example, section 700 is a more detailed illustration of wing spar fitting 600 and part 622 of body frame fitting 602 in FIG. 7. In this depicted example, wing spar fitting 600 is connected to part 622 with two fasteners. Only fastener 650 is visible in this example. Fastener 648 is hidden from view on the other side of section 638.

Figure 9:
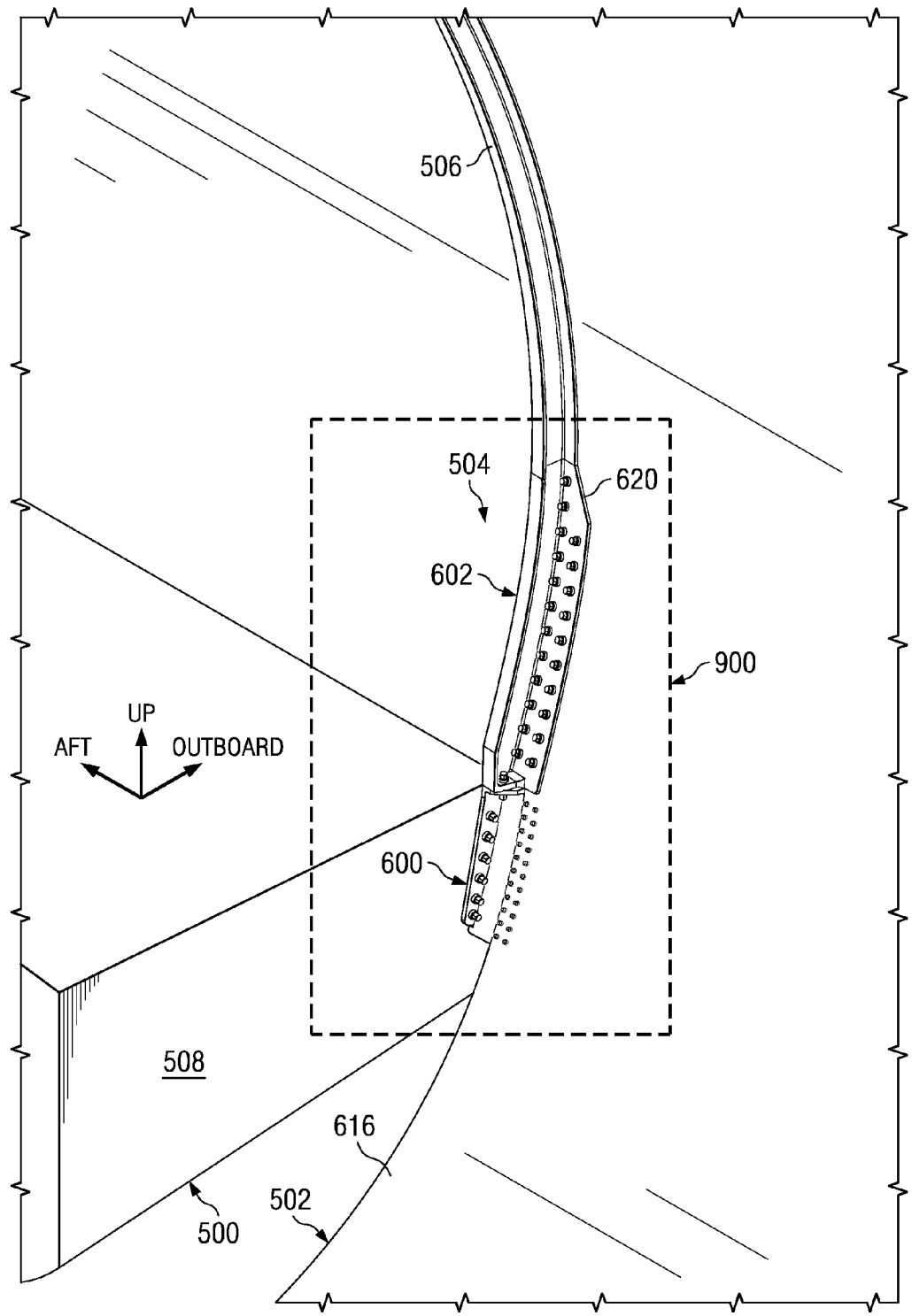
FIG. 9 is a diagram of a right isometric view of the mechanical joint in FIG. 5 in accordance with an advantageous embodiment of the present invention.

Turning now to FIG. 9, a diagram of a right isometric view of the mechanical joint in FIG. 5 is depicted in accordance with an advantageous embodiment of the present invention. In this view, the mechanical joint, wing spar to body fitting 504, can be seen from the interior of the body. Part 620 of body frame fitting 602 is connected to wing spar fitting 600 in this example. Part 622 is not visible and is on the exterior of body panel 616.

Figure 10:
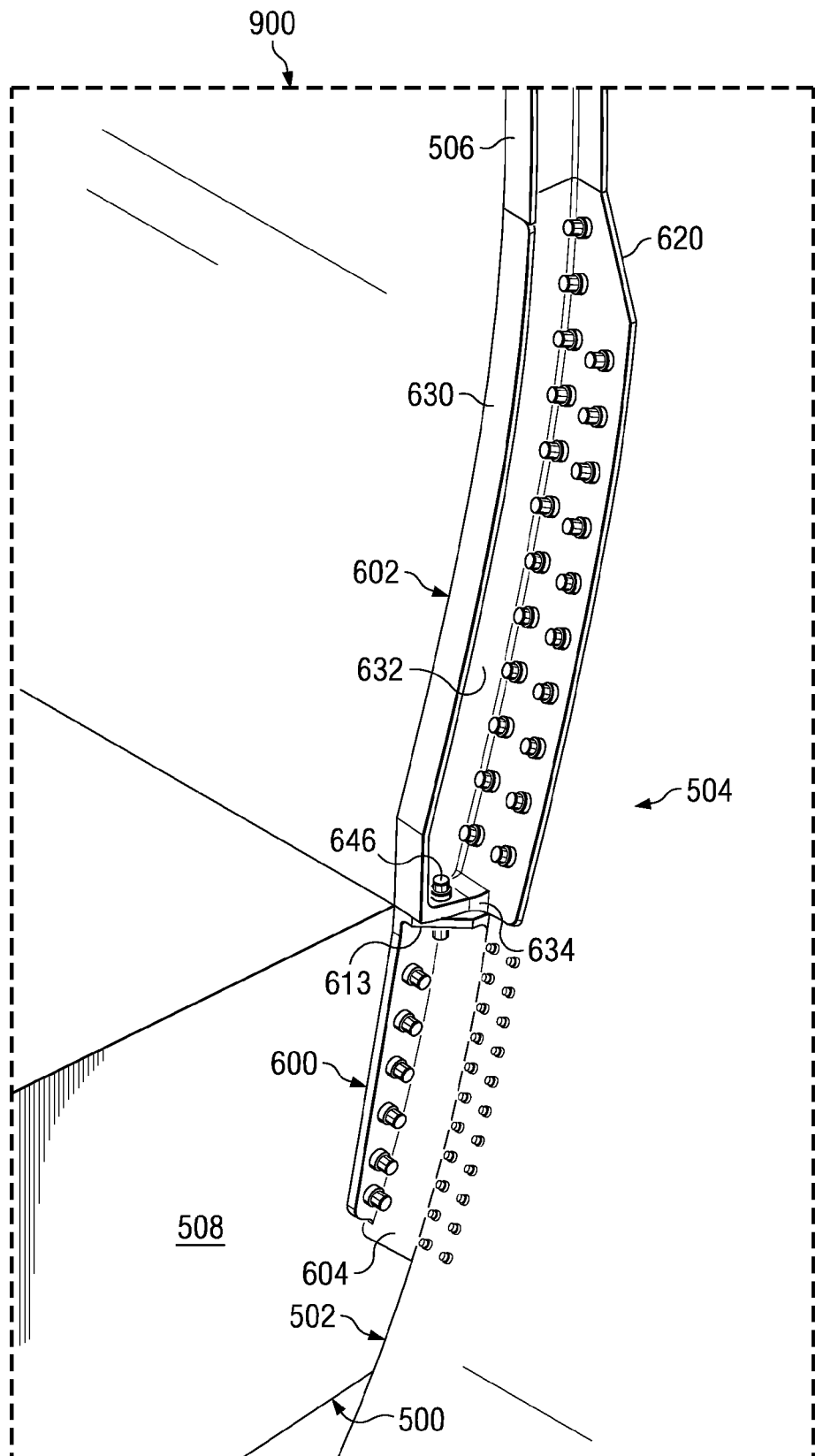
FIG. 10 is a more detailed illustration of the mechanical joint in FIG. 9 in accordance with an advantageous embodiment of the present invention.

With reference now to FIG. 10, a more detailed illustration of the mechanical joint in FIG. 9 is depicted in accordance with an advantageous embodiment of the present invention. In this example, wing spar to body fitting 504 is a more detailed illustration of joint 504 in section 900 in FIG. 9. As depicted in FIG. 10, part 620 of body frame fitting 602 is connected to wing spar fitting 600. Connector section 634 is aligned with connector section 613 when wing 500 is put in place with respect to body 502. Fastener 646 is used to connect or attach wing spar fitting 600 and part 620 of body frame fitting 602 to each other.

In this example, bulkhead frame 506 is connected to body frame fitting 602 through a splice plate, which is not shown in these examples. Of course, other mechanisms may be used to connect these parts to each other depending on the particular implementation.

Figure 11:
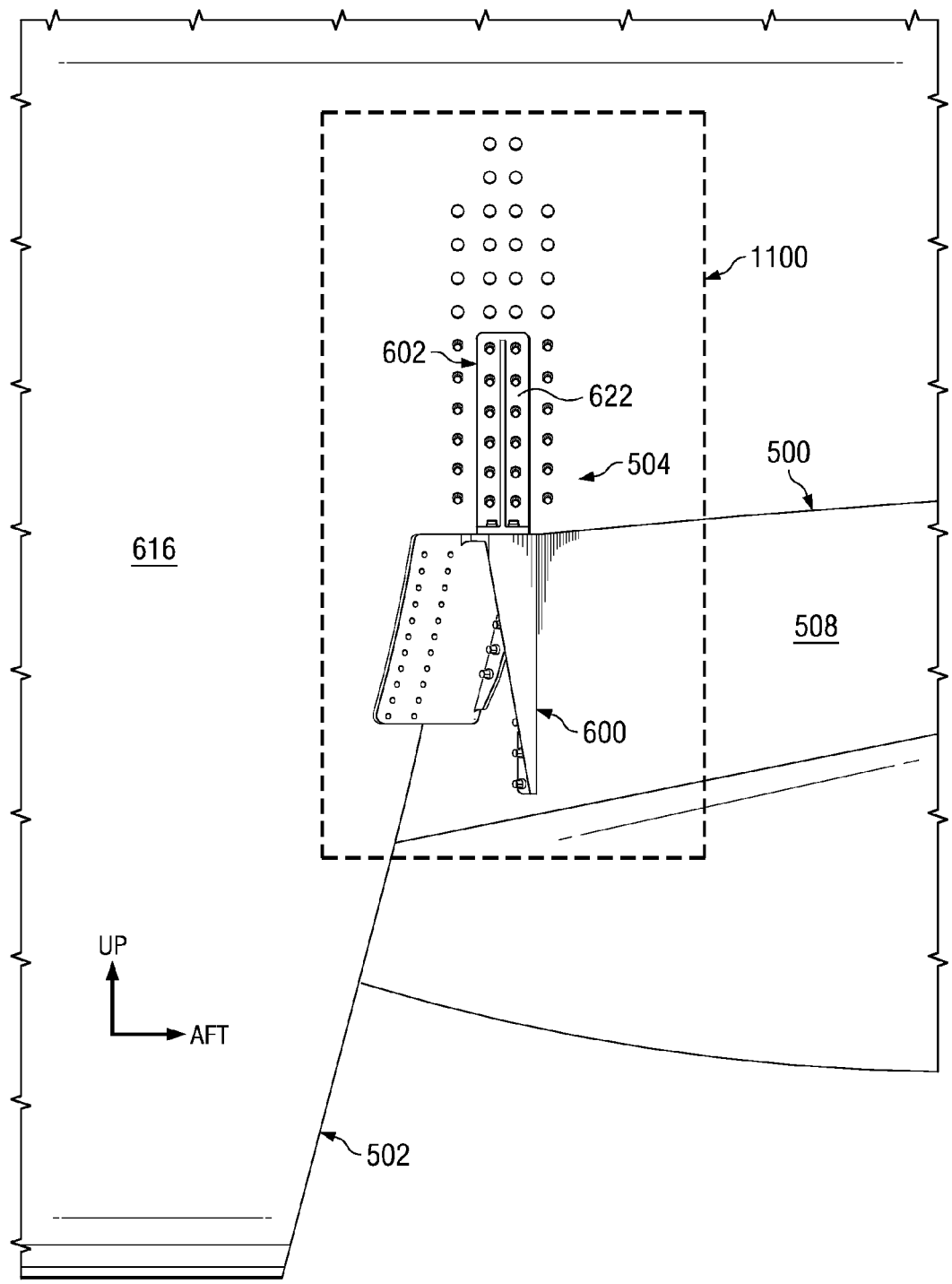
FIG. 11 is an illustration of a left view of the mechanical joint in FIG. 5 in accordance with an advantageous embodiment of the present invention.

Turning now to FIG. 11, an illustration of a left view of the mechanical joint in FIG. 5 is depicted in accordance with an advantageous embodiment of the present invention. In this view of the mechanical joint formed using wing spar to body fitting 504, wing spar fitting 600 is shown connected to part 622 of body frame fitting 602.

Figure 12:
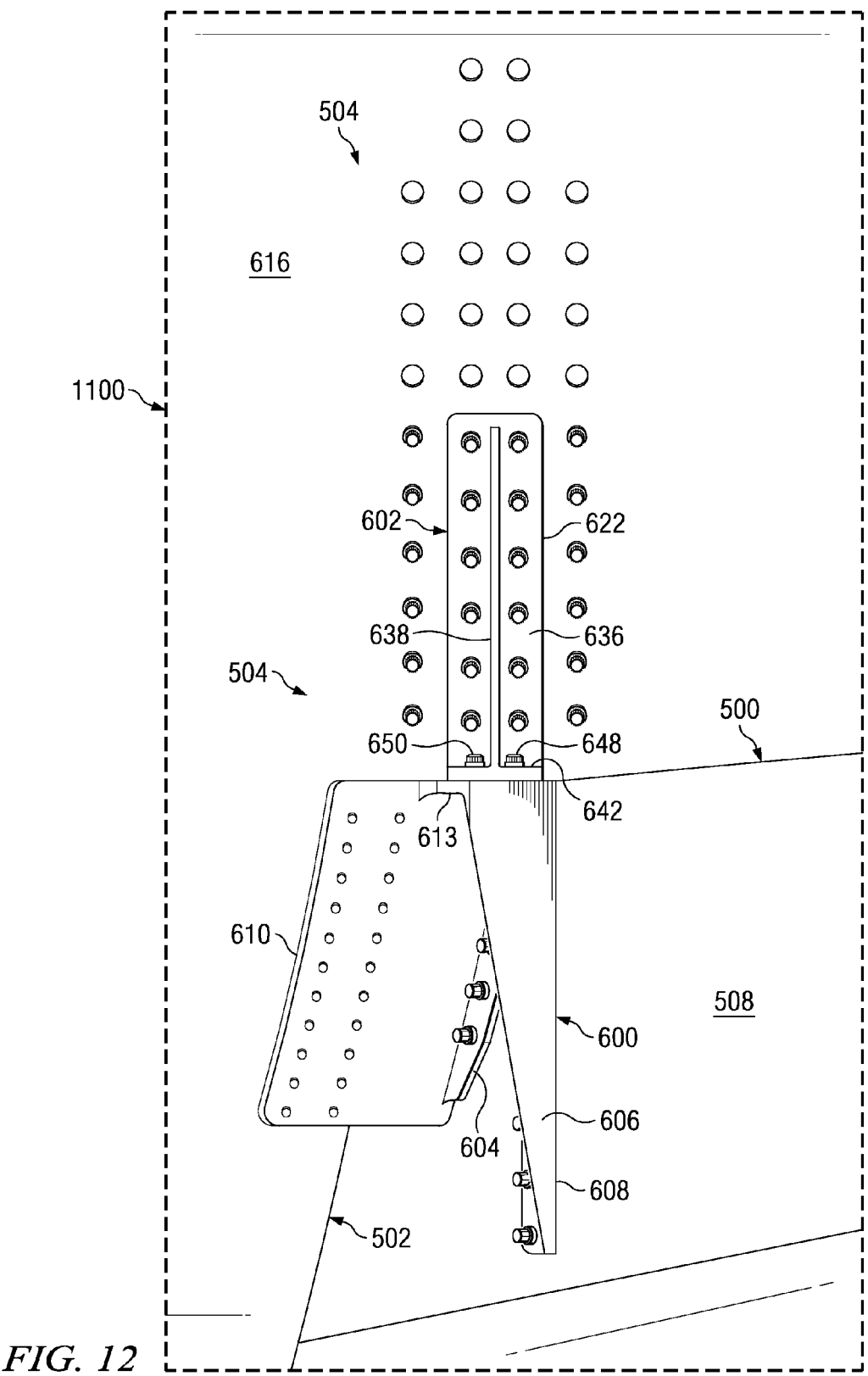
FIG. 12 is a more detailed illustration of the mechanical joint in FIG. 11 in accordance with an advantageous embodiment of the present invention.

With reference now to FIG. 12, a more detailed illustration of the mechanical joint in FIG. 11 is depicted in accordance with an advantageous embodiment of the present invention. In this example, a more detailed illustration of part 622 for body frame fitting 602 and wing spar fitting 600 is depicted. In this example, the illustration of wing spar to body fitting 504 is a more detailed illustration of section 1100 in FIG. 11. As mentioned before, body frame fitting 602 is attached to bulkhead frame 506 in body 502 prior to attachments of a wing to body 502.

This illustration depicts the connection of wing spar fitting 600 to part 622 of body frame fitting 602. In particular, connector section 613 is connected to connector section 642 through the use of fasteners 648 and 650. These fasteners are put in place after wing 500 has been positioned and is ready for attachment to body 502. The creation of this joint does not require any penetration of a sealed area or boundary.

Figure 13:
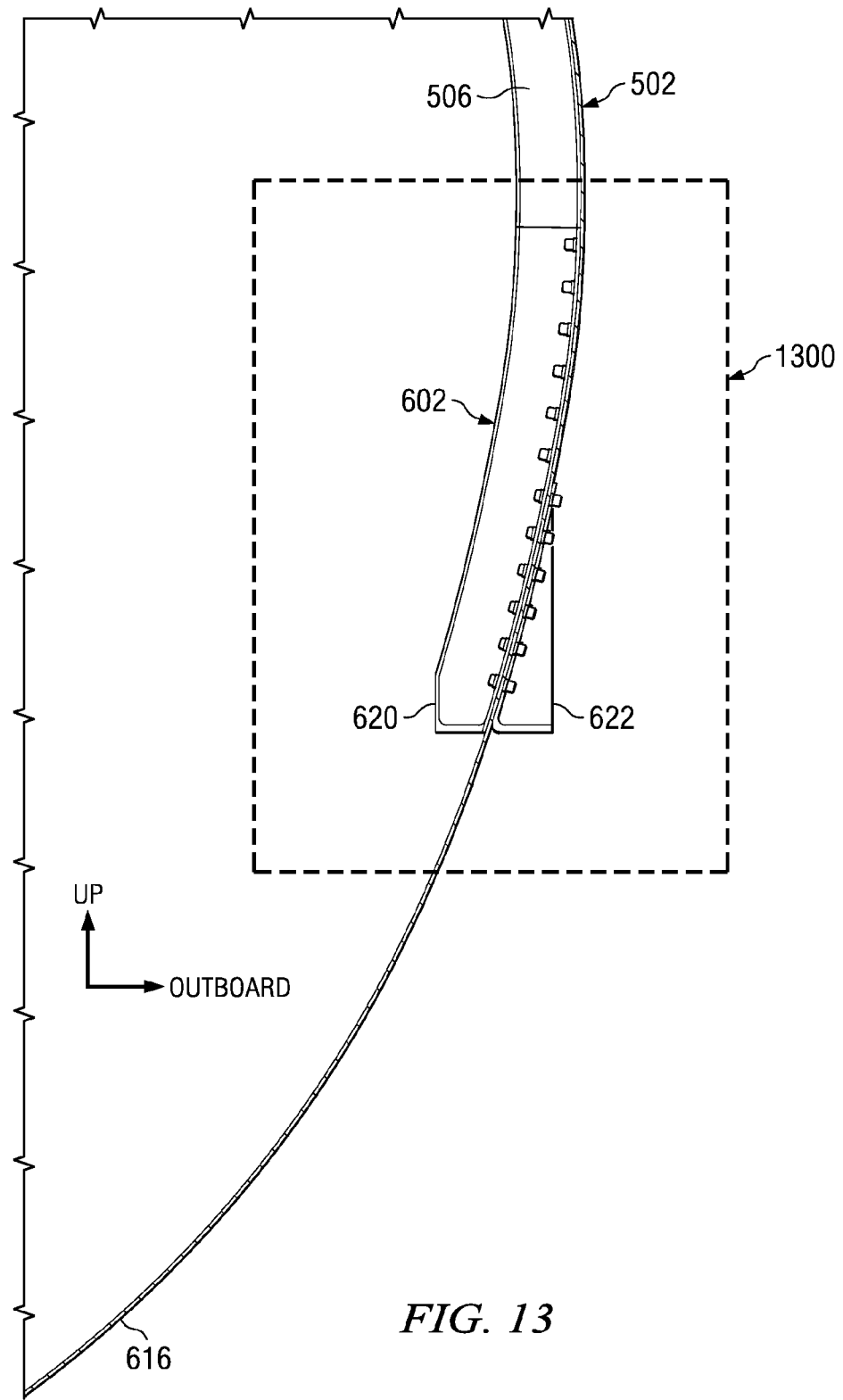
FIG. 13 is a diagram of a front view for a body frame sub-assembly in accordance with an advantageous embodiment of the present invention.

With reference next to FIG. 13, a diagram of a front view for a body frame sub-assembly is depicted in accordance with an advantageous embodiment of the present invention. This example illustrates body frame fitting 602 as placed in body 502. In particular, body frame fitting 602 is attached to bulkhead frame 506 in this example. Body frame fitting 602 contains part 620 and part 622. These two parts are assembled connected to each other such that body panel 616 is located between these two parts. This assembly occurs prior to the attachment of a wing to body 502.

Figure 14:
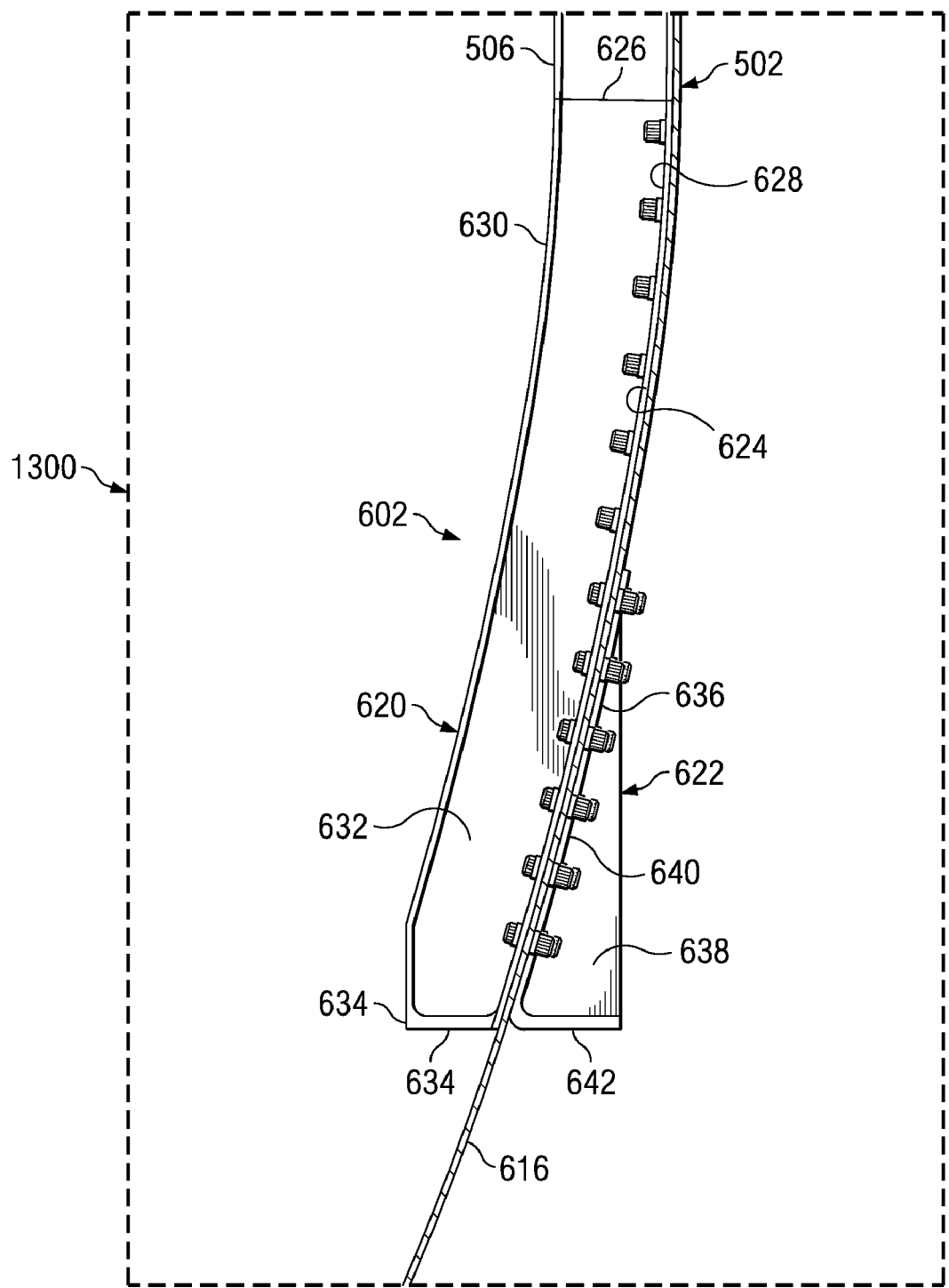
FIG. 14 is a more detailed illustration of the body frame fitting from FIG. 13 in accordance with an advantageous embodiment of the present invention.

Turning now to FIG. 14, a more detailed illustration of the body frame fitting from FIG. 13 is depicted in accordance with an advantageous embodiment of the present invention. In this example, body frame fitting 602 is a more detailed illustration of this component in section 1300 in FIG. 13. In this example, connector section 634 and connector section 642 include holes that are to be aligned with holes in a wing spar fitting. Fasteners are then used to create the mechanical joint to connect a wing to body 502.

Figure 15:
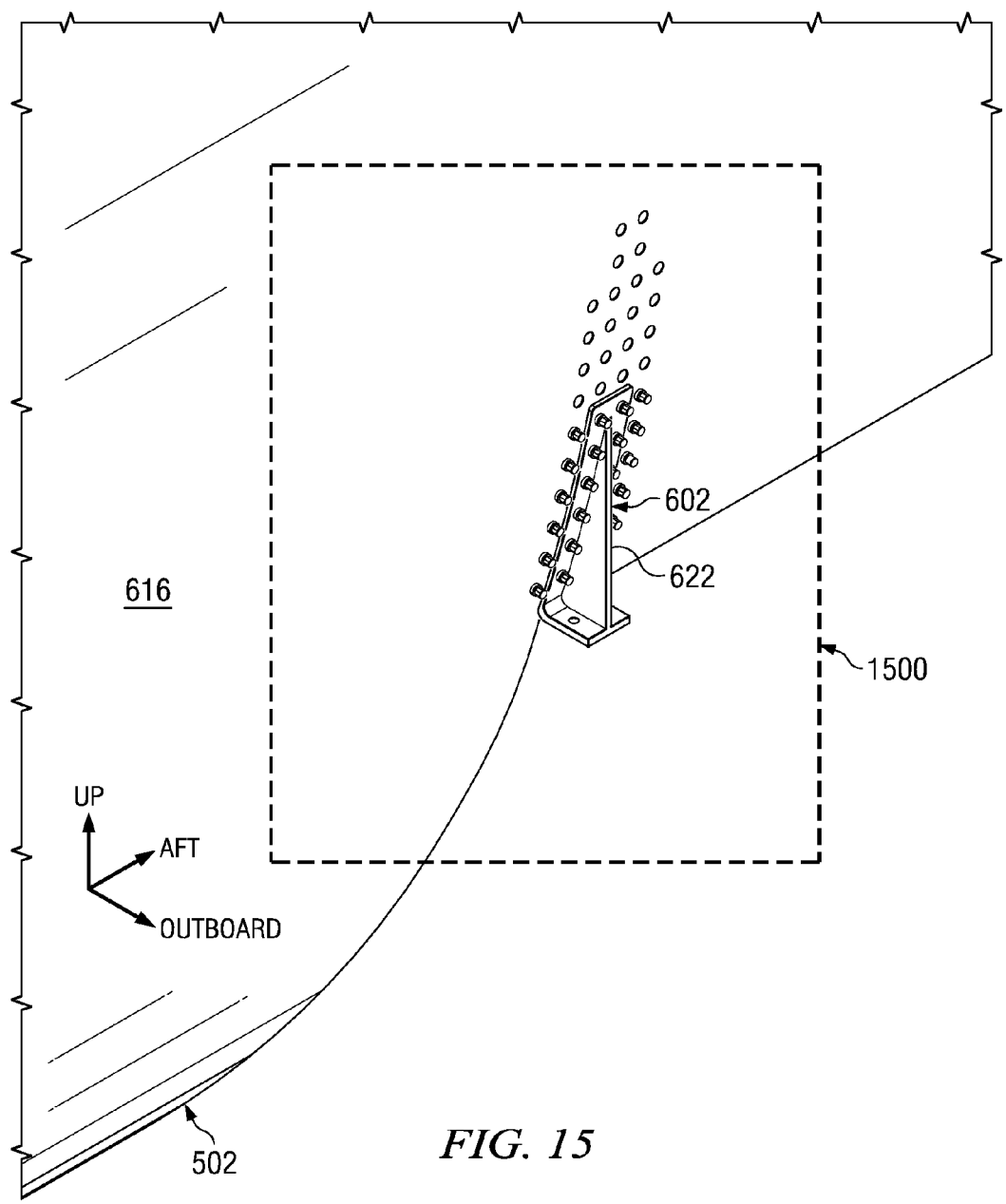
FIG. 15 is an illustration of a left isometric view of the body sub-assembly in FIG. 13 in accordance with an advantageous embodiment of the present invention.

Turning now to FIG. 15, an illustration of a left isometric view of the body sub-assembly in FIG. 13 is depicted in accordance with an advantageous embodiment of the present invention. In this diagram, only part 622 of body frame fitting 602 is visible as being attached to the other part of body frame fitting 602, which is in the interior with respect to body panel 616.

Figure 16:
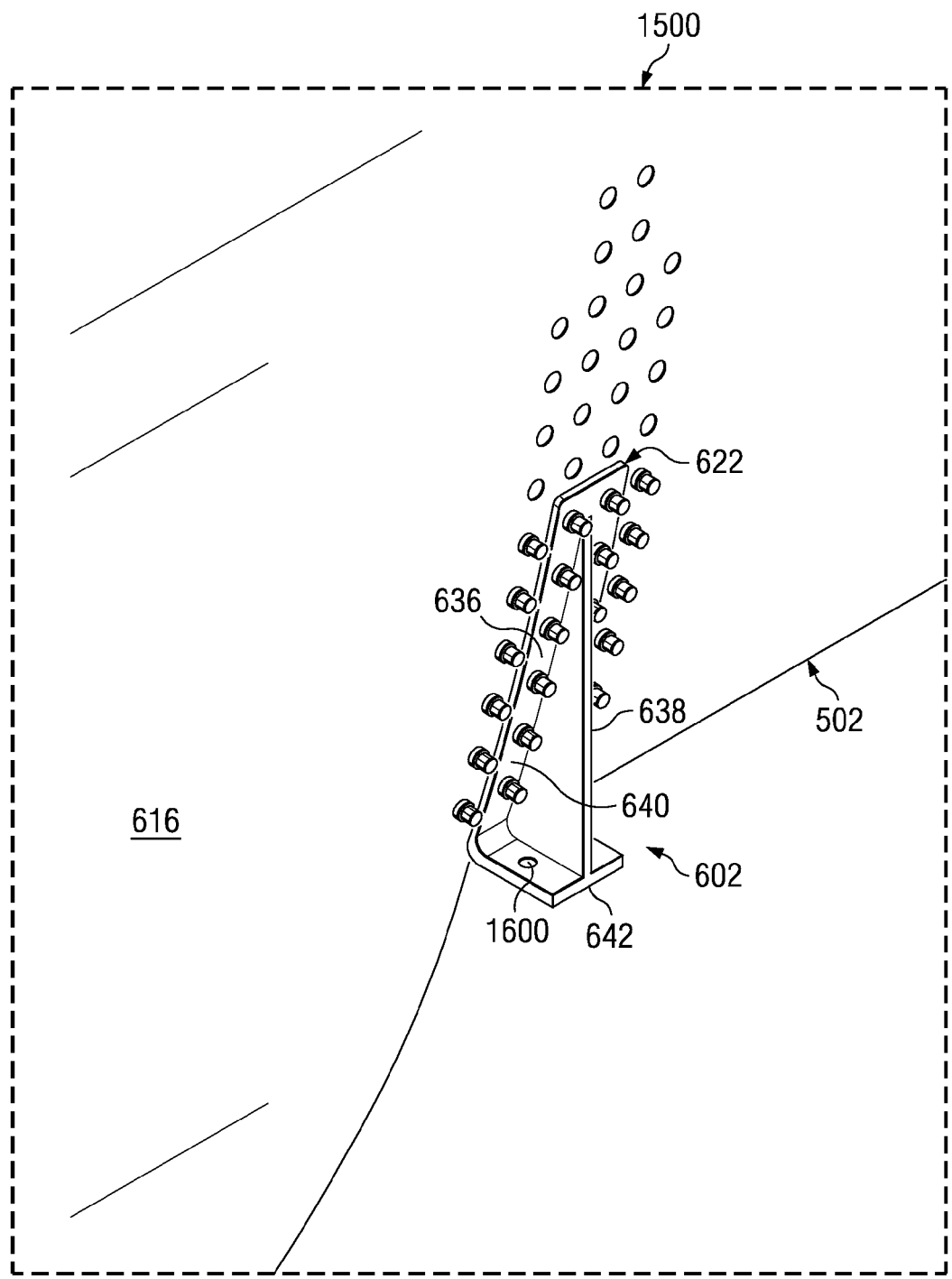
FIG. 16 is a more detailed illustration of the body frame fitting in a body sub-assembly in FIG. 15 in accordance with an advantageous embodiment of the present invention.

Turning now to FIG. 16, a more detailed illustration of the body frame fitting in a body sub-assembly in FIG. 15 is depicted in accordance with an advantageous embodiment of the present invention. In this example, the illustration of body fitting 602 in FIG. 16 is a more detailed illustration of section 1500 in FIG. 15. In this embodiment, hole 1600 has been formed within connector section 642 to receive a fastener for connecting part 622 to a wing spar fitting, such as wing spar fitting 600 in FIG. 6. Another hole (not shown) is present on the other side of connector section 642 and is hidden from view by section 638.

Figure 17:
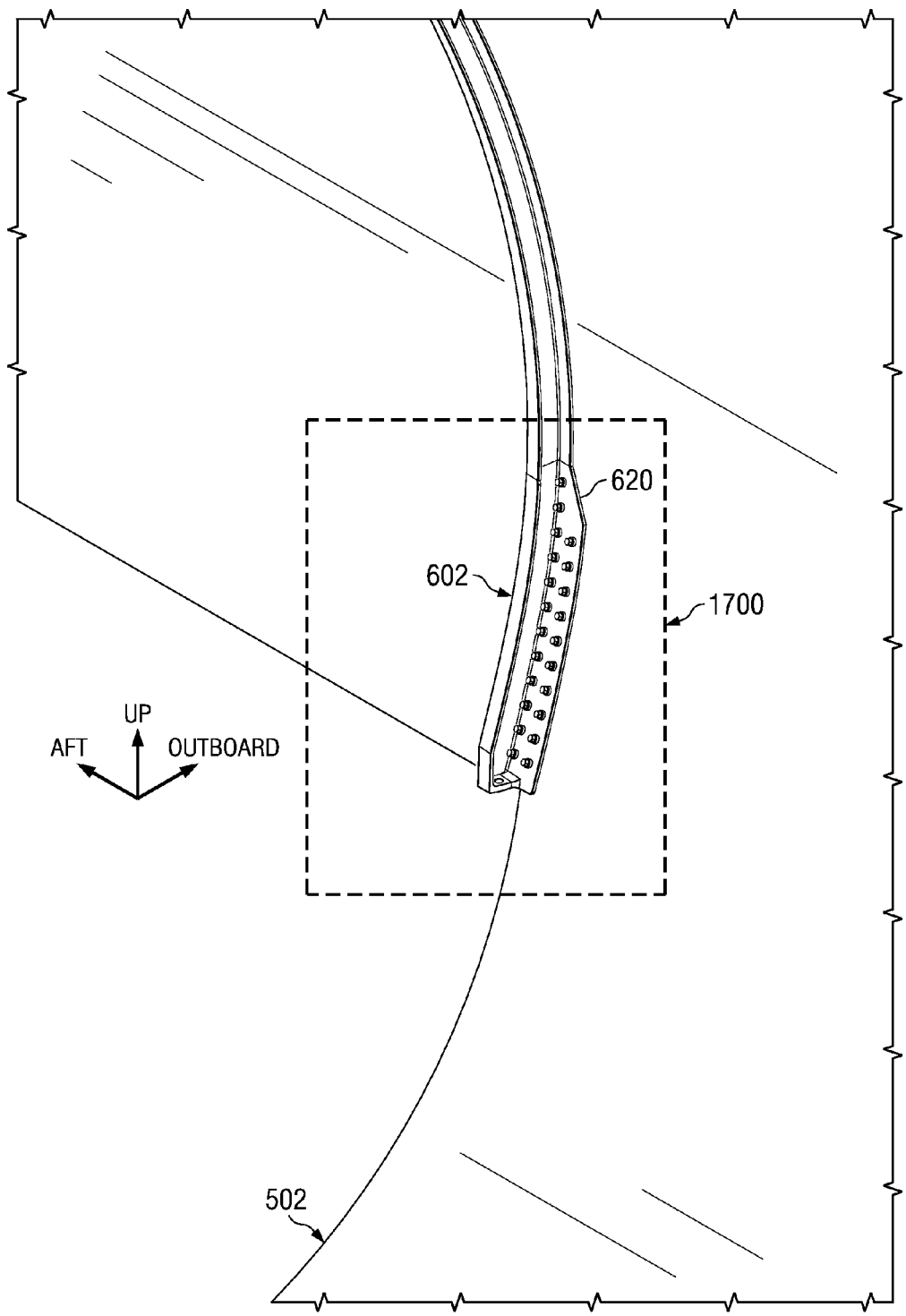
FIG. 17 is a diagram of a right isometric view of the body sub-assembly in FIG. 13 in accordance with an advantageous embodiment of the present invention.

Next, FIG. 17 is a diagram of a right isometric view of the body sub-assembly in FIG. 13 in accordance with an advantageous embodiment of the present invention. In this view, only part 620 of body frame fitting 602 is visible in the interior portion of body 502.

Figure 18:
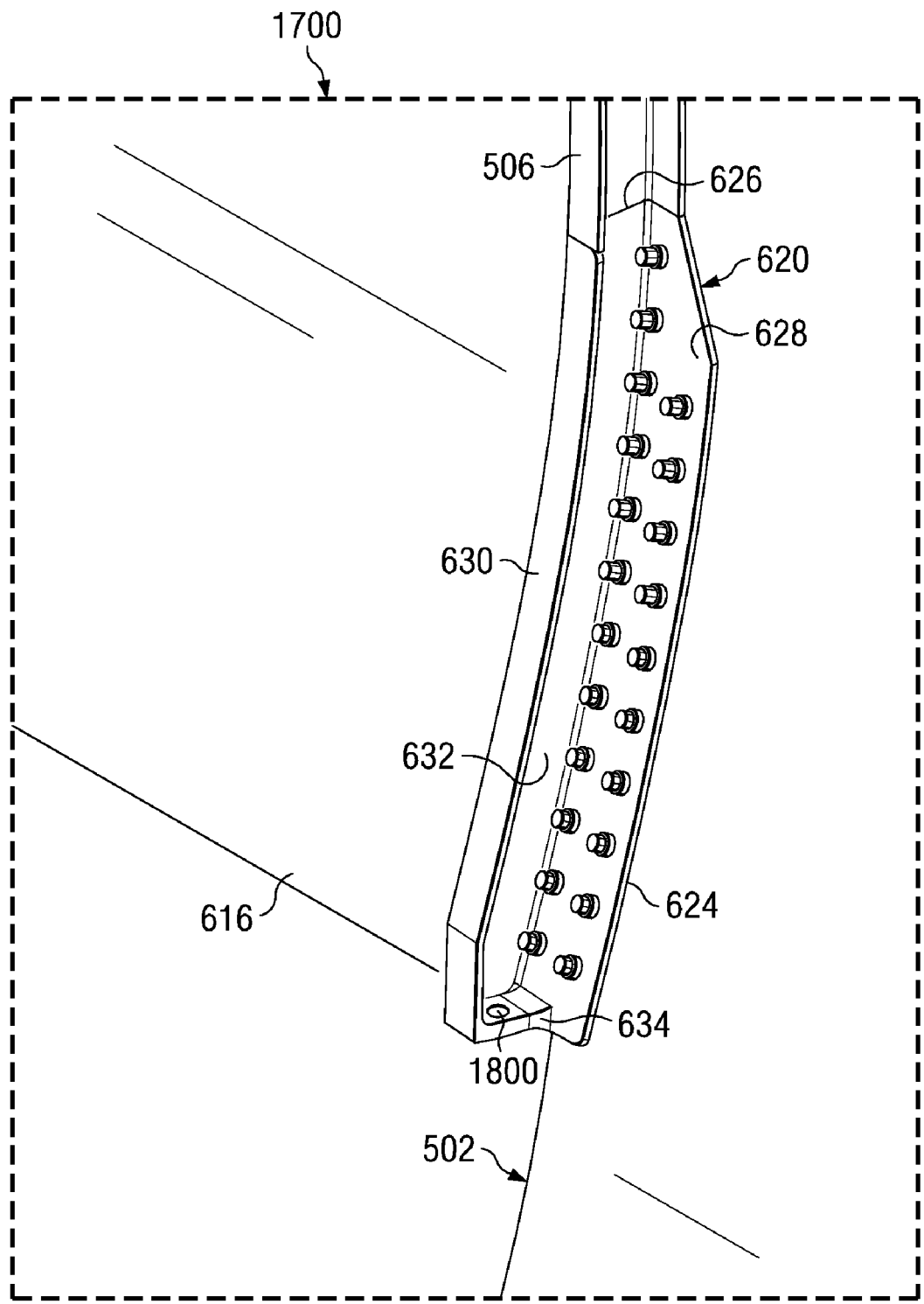
FIG. 18 is a more detailed illustration of a body frame fitting in the body sub-assembly in FIG. 17 in accordance with an advantageous embodiment of the present invention.

Turning now to FIG. 18, a more detailed illustration of a body frame fitting in the body sub-assembly in FIG. 17 is depicted in accordance with an advantageous embodiment of the present invention. In this example, the illustration of body fitting 602 is a more detailed illustration of the body fitting from section 1700 in FIG. 17. In this illustration, hole 1800 is present in connector section 634 of part 620 in body frame fitting 602. Hole 1800 is formed to receive a fastener to connect part 620 to a wing spar fitting when a wing is attached to body 502.

Figure 19:
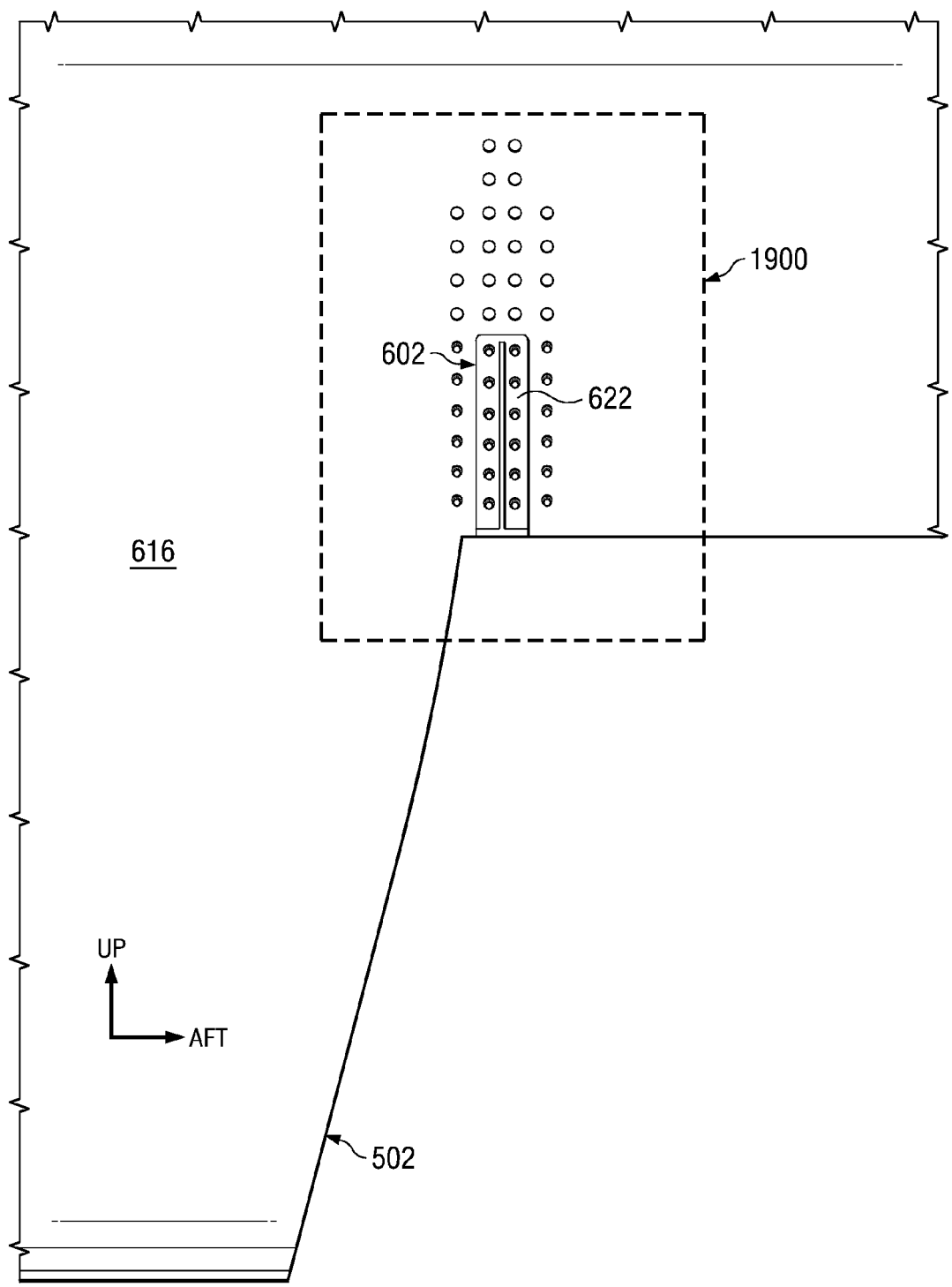
FIG. 19 is an illustration of a left view of the body sub-assembly in FIG. 13 in accordance with an advantageous embodiment of the present invention.

Turning next to FIG. 19, an illustration of a left view of the body sub-assembly in FIG. 13 is depicted in accordance with an advantageous embodiment of the present invention. In this illustrative view, only part 622 of body frame fitting 602 is present. Body panel 616 blocks the view of the other part of body frame fitting 602 in this illustrative example.

Figure 20:
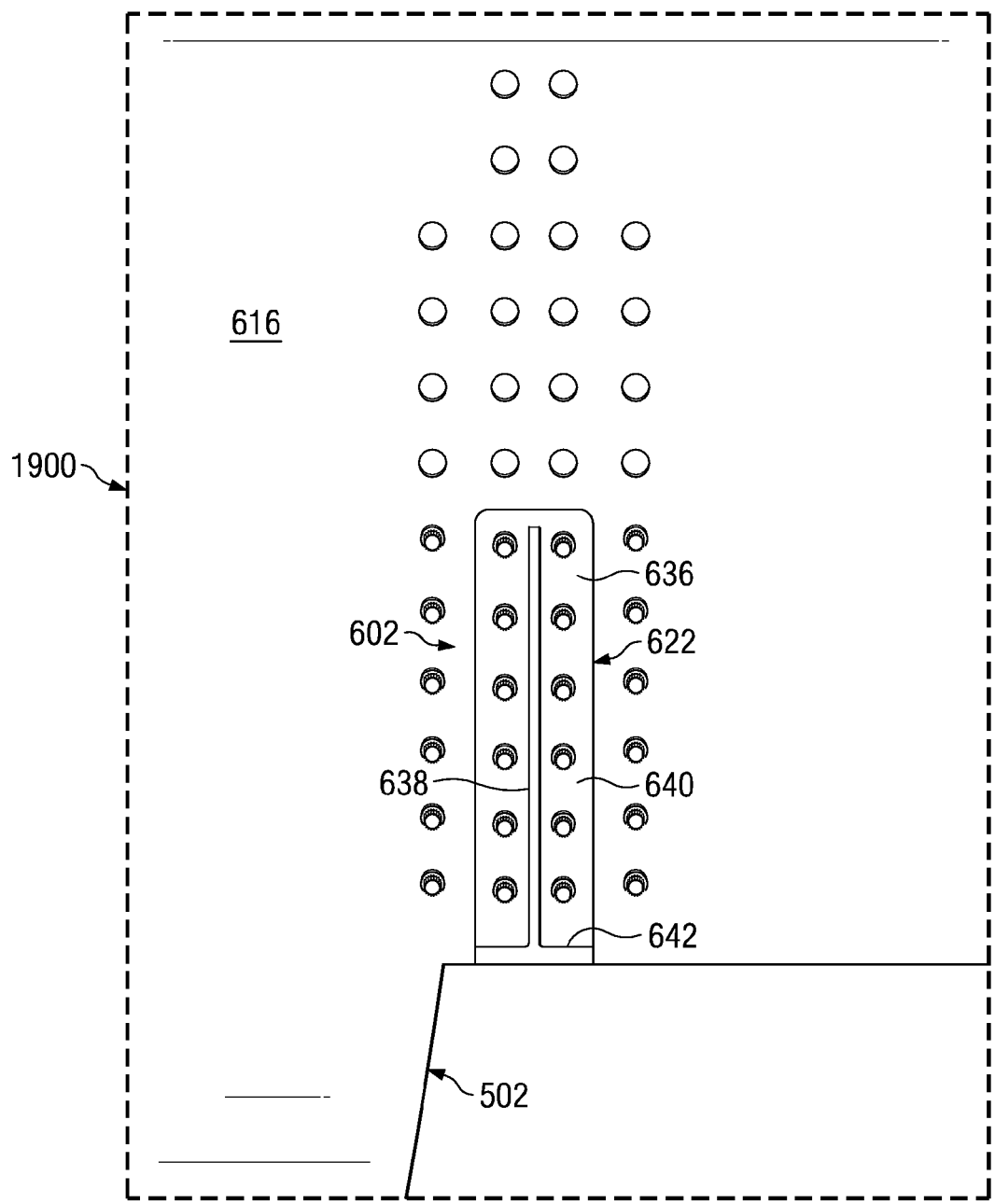
FIG. 20 is a more detailed illustration of the body frame fitting in FIG. 19 in accordance with an advantageous embodiment of the present invention.

Turning now to FIG. 20, a more detailed illustration of the body frame fitting in FIG. 19 is depicted in accordance with an advantageous embodiment of the present invention. In this example, a more detailed illustration of a left view of body fitting 602 is depicted from section 1900 in FIG. 19.

Figure 21:
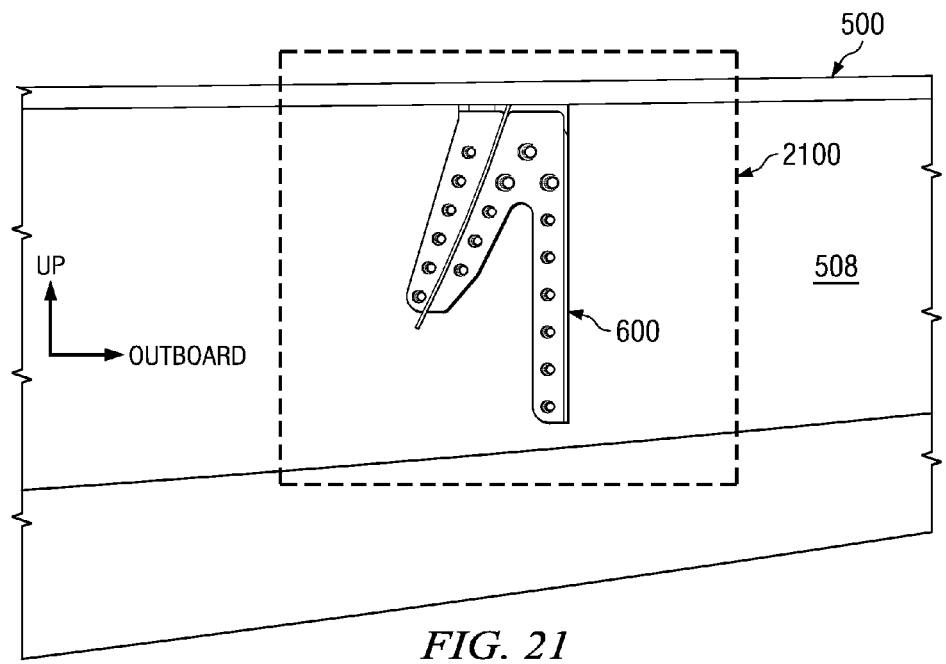
FIG. 21 is a diagram of a front view of a wing sub-assembly in accordance with an advantageous embodiment of the present invention.

Turning now to FIG. 21, a diagram of a front view of a wing sub-assembly is depicted in accordance with an advantageous embodiment of the present invention. Wing spar fitting 600 is illustrated as being attached to wing spar 508 of wing 500. Wing spar fitting 600 is attached to wing spar 508 prior to wing 500 being positioned and connected to a body.

Figure 22:
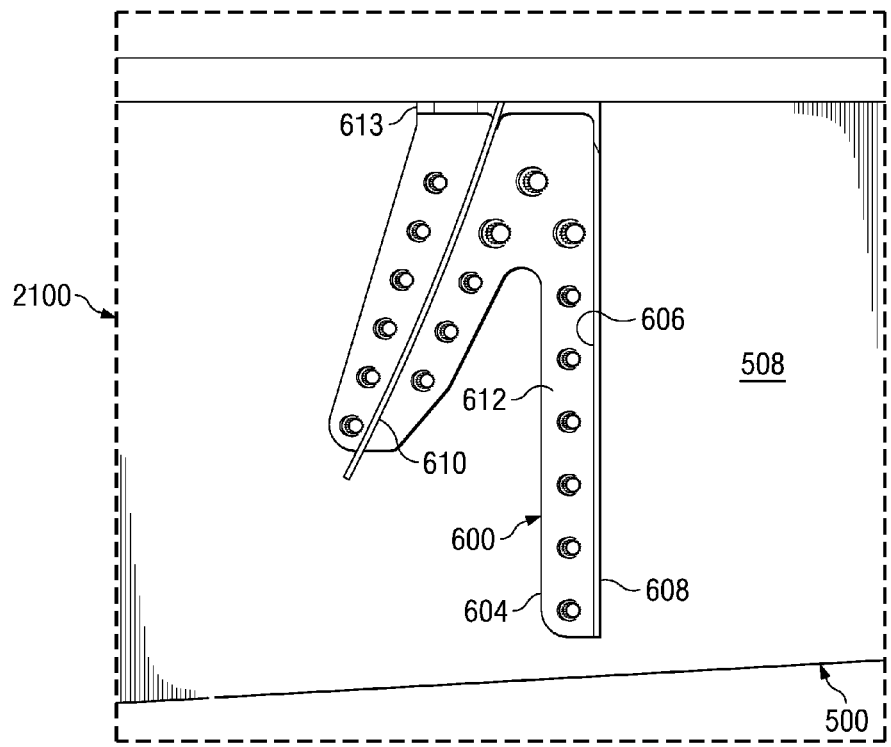
FIG. 22 is a more detailed illustration of the wing spar fitting in FIG. 21 in accordance with an advantageous embodiment of the present invention.

In FIG. 22, a more detailed illustration of the wing spar fitting in FIG. 21 is depicted in accordance with an advantageous embodiment of the present invention. In this example, the illustration of wing spar fitting 600 is a more detailed illustration of section 2100 in FIG. 21. Using wing spar fitting 600, it is possible to seal and test all structural fasteners without penetrating the sealed area in the wing.

Figure 23:
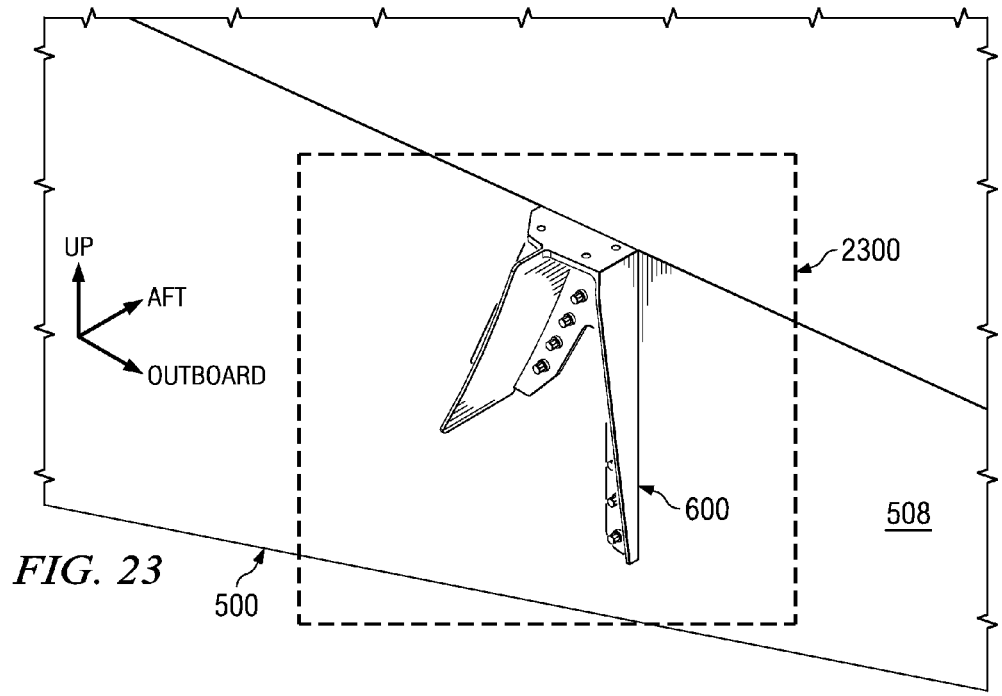
FIG. 23 is a diagram of a left isometric view of the wing sub-assembly in FIG. 21 in accordance with an advantageous embodiment of the present invention.

With reference to FIG. 23, a diagram of a left isometric view of the wing sub-assembly in FIG. 21 is depicted in accordance with an advantageous embodiment of the present invention.

Figure 24:
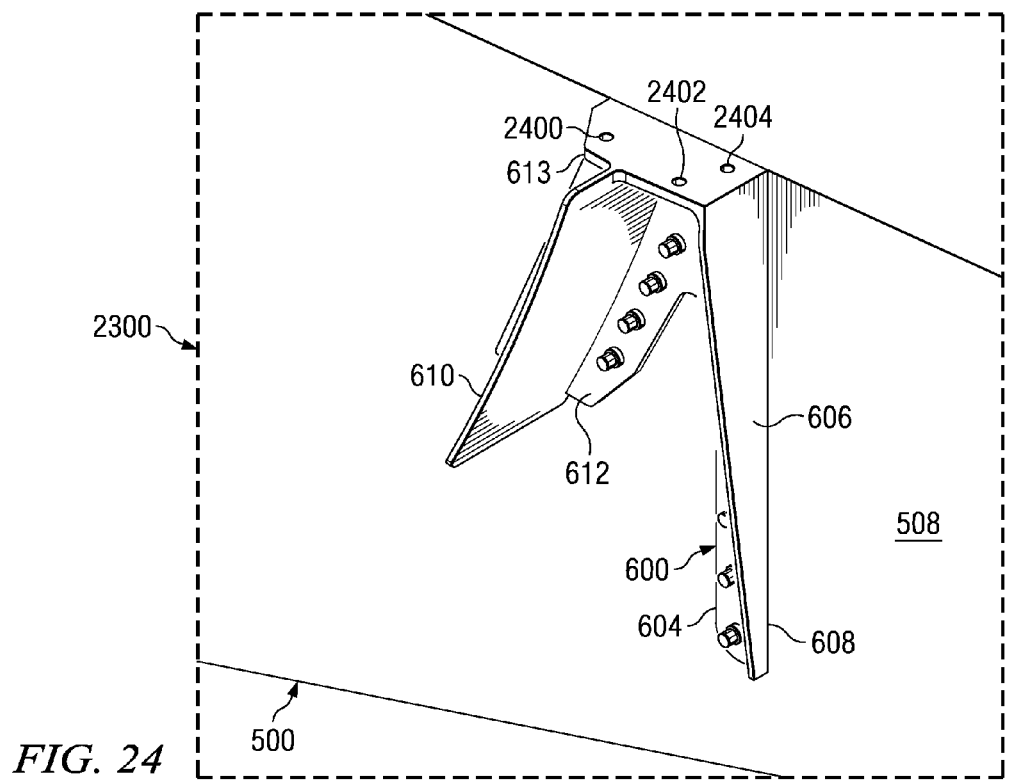
FIG. 24 is a more detailed illustration of the wing spar fitting in FIG. 23 in accordance with an advantageous embodiment of the present invention.

With reference now to FIG. 24, a more detailed illustration of the wing spar fitting in FIG. 23 is depicted in accordance with an advantageous embodiment of the present invention. In these examples, a more detailed illustration of section 2300 in FIG. 23 is shown. In this more detailed view of wing spar fitting 600, holes 2400, 2402, and 2404 have been formed in connector section 613. These holes are designed to receive fasteners for use in connecting connector section 613 to the connector sections of a body frame fitting. The use of these fasteners to connect the fittings do not penetrate a sealed area or boundary in the advantageous embodiments.

Figure 25:
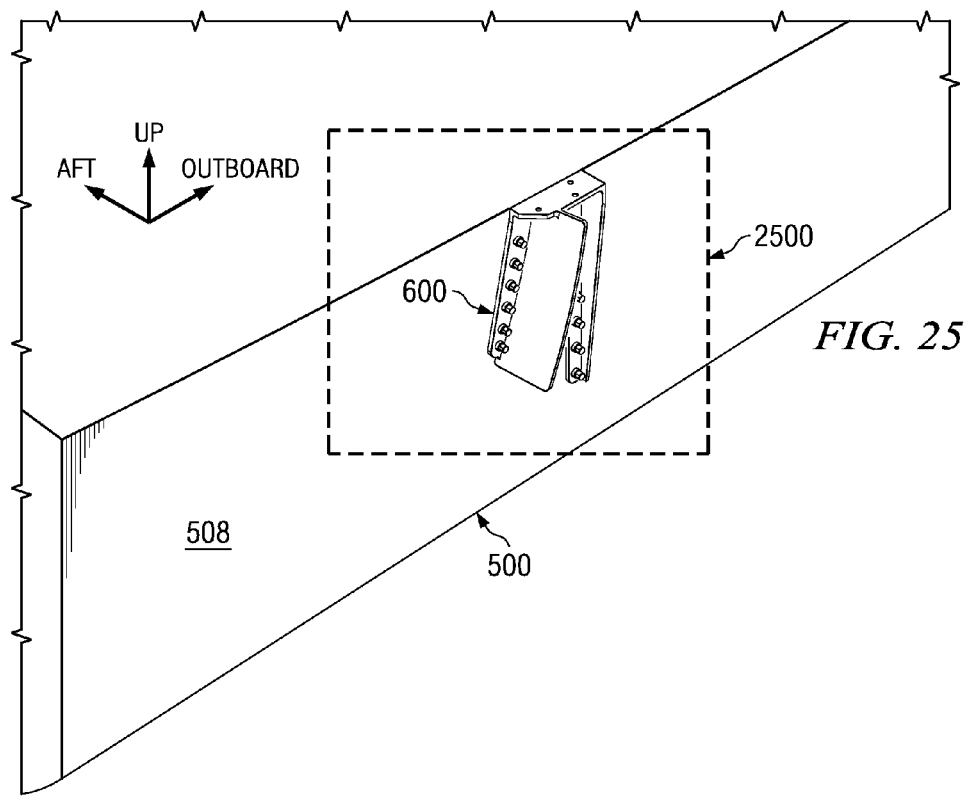
FIG. 25 is a diagram of a right isometric view of the wing sub-assembly in FIG. 21 in accordance with an advantageous embodiment of the present invention.

Next, in FIG. 25, a diagram of a right isometric view of the wing sub-assembly in FIG. 21 is depicted in accordance with an advantageous embodiment of the present invention.

Figure 26:
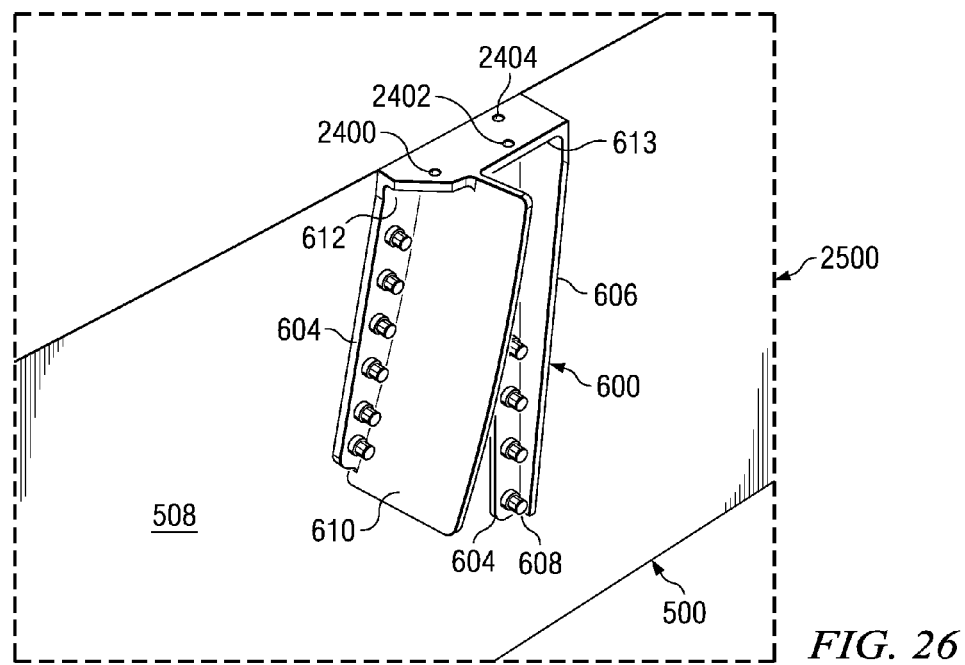
FIG. 26 is a more detailed illustration of the wing spar fitting in FIG. 25 in accordance with an advantageous embodiment of the present invention.

With reference next to FIG. 26, a more detailed illustration of the wing spar fitting in FIG. 25 is depicted in accordance with an advantageous embodiment of the present invention. In this example, the illustration of wing spar fitting 600 is a more detailed illustration of this fitting from section 2500 in FIG. 25.

Figure 27:
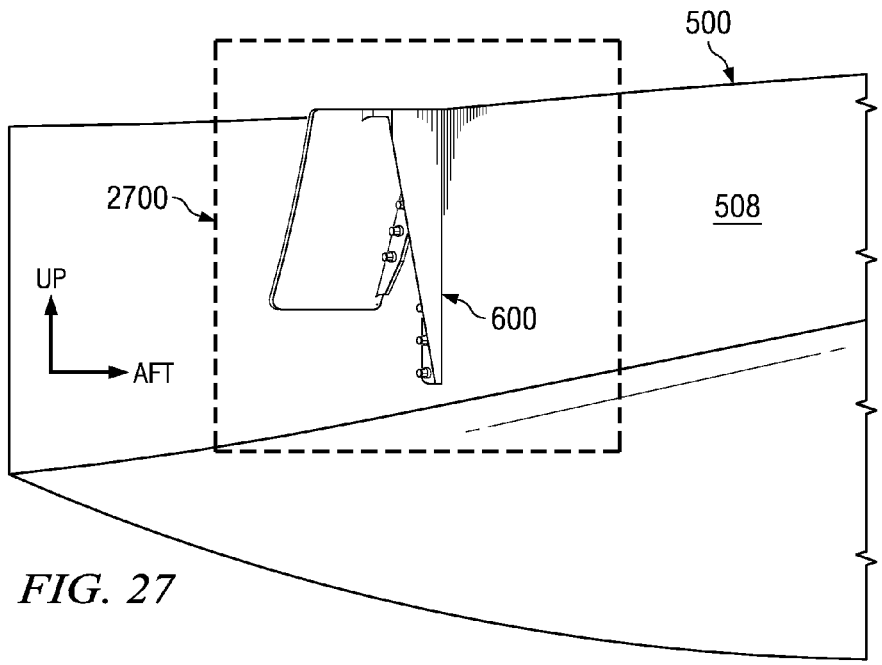
FIG. 27 is a diagram of a left view of the wing sub-assembly in FIG. 21 in accordance with an advantageous embodiment of the present invention.

With reference to FIG. 27, a diagram of a left view of the wing sub-assembly in FIG. 21 is depicted in accordance with an advantageous embodiment of the present invention.

Figure 28:
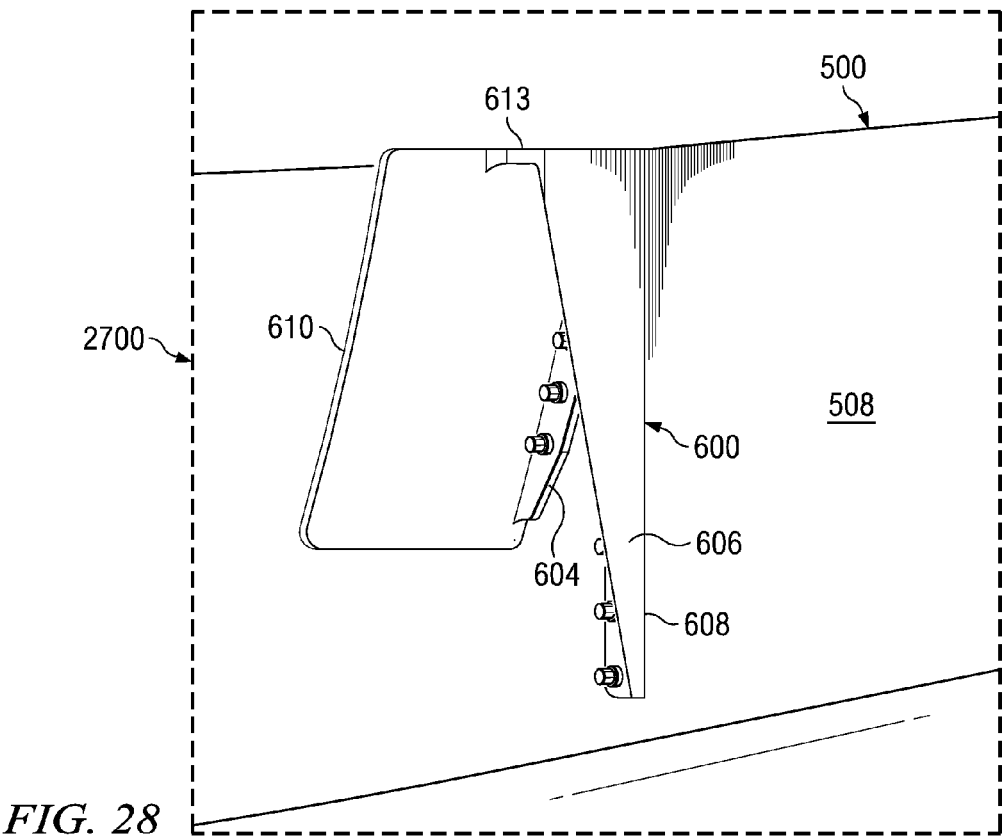
FIG. 28 is a more detailed illustration of the wing spar fitting in FIG. 27 in accordance with an advantageous embodiment of the present invention.

With reference next to FIG. 28, a more detailed illustration of the wing spar fitting in FIG. 27 is depicted in accordance with an advantageous embodiment of the present invention. The illustration of wing spar fitting 600 is a more detailed illustration of this wing spar fitting from section 2700 in FIG. 27.

Thus, the present invention provides a method and apparatus for connecting a wing to a body in an aircraft. The different embodiments use a first and second fitting in which the first fitting is attached to a structural component in the body with the second fitting being connected to a structural component in the wing. These fittings are attached to the body and wings prior to positioning the wing for attachment to the body. Further, testing and other processes, with respect to the different assemblies for the body and wing, may be completed with these fittings in place. The attachment of the wing to the body by connecting or attaching these two fitting to each other do not penetrate any sealed areas or boundaries in the wing and/or the body. The connection of these two fittings to each other with fasteners, in these examples, form a mechanical joint to connect the wing to the body.

Although the fasteners shown in these examples take the form of tension bolts, other types of fasteners may be used depending on the particular implementation. For example, the fastener also may be a pin, a rivet, or a screw. Also, the particular shape of the fittings illustrated in the drawings may vary depending on the particular implementation.

The illustration of particular configurations are not meant to limit the manner in which a wing fitting and a body fitting may be implemented. For example, the wing fitting may be implemented for attachment to a different structure other than a wing spar depending on the particular implementation. As well, a body frame fitting may be implemented for connection to another structural component in the body other than a bulkhead frame or a body frame. Each fitting is designed for connection to a particular structural component as well as having another section for connection to the other fitting to create the mechanical joint.

The description of the present invention has been presented for purposes of illustration and description, and is not intended to be exhaustive or limited to the invention in the form disclosed. Many modifications and variations will be apparent to those of ordinary skill in the art. For example, the illustrative embodiments show the body frame fitting as being attached to a frame on the body. In other advantageous embodiments, the body frame fitting may be an integral part of the frame, rather than requiring attachment to the frame. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for assembling an aircraft, the method comprising:
   connecting a wing spar fitting to a spar in a wing for the aircraft, the wing spar fitting being a bottom portion of a mechanical joint for attaching the wing to a body of the aircraft;
   connecting a body frame fitting to a frame in the body of the aircraft, the body frame fitting being a top portion of the mechanical joint, the body frame fitting forms a bottom portion of a body bulkhead member such that the body bulkhead member does not abut the wing without the body frame fitting, and the body frame fitting located and oriented such that the wing spar fitting is vertically attached to the body frame fitting when the wing is positioned for attachment to the body of the aircraft;
   positioning the wing with respect to the body of the aircraft for attachment to the body; and
   attaching the body frame fitting and the wing spar fitting to each other with a set of fasteners without penetrating any sealed boundaries for a number of fuel tanks in the wing and a pressurized area in the body after the body frame fitting is aligned to the wing spar fitting, the wing being attached to the body by a mechanical joint formed by the body frame fitting and the wing spar fitting, the fasteners vertically connecting the body frame fitting directly to the wing spar fitting as the wing is raised to the body, the set of fasteners passing through only the body frame fitting and the wing spar fitting.

2. The method of claim 1, wherein the set of fasteners are a set of tension bolts.

3. The method of claim 1 further comprising:
   testing the wing prior to attaching the wing to the body.

4. The method of clam 1, wherein the spar is a front spar, a second wing spar fitting is attached to a rear spar in the wing, a second body frame fitting is attached to a second frame in the body, and wherein the attaching step further comprises:
   attaching the second body frame fitting to the second wing spar fitting with a second set of fasteners without penetrating the sealed boundaries for the number of fuel tanks in the wing and the pressurized area in the body to attach the rear spar to the second frame in the body.

5. The method of claim 1, wherein the frame is a bulkhead frame.

6. The method of claim 1, wherein the body frame fitting has two parts and wherein the step of connecting a body frame fitting to the frame in a body for the aircraft comprises:
   connecting the first part to the frame in the body of the aircraft, wherein the first part is adjacent to an interior side of the body panel;
   placing the second part on an exterior side of the body panel; and
   attaching the second part to the first part using a set of fasteners, wherein the body panel is located between the first part and the second part.

7. The method of claim 1, wherein the body frame fitting is made from one of aluminum, titanium, and a composite material.

8. The method of claim 1, wherein the wing spar fitting is made one of aluminum, titanium, and a composite material.

9. The method of claim 1 further comprising:
   testing components in the body and components in the wing prior to attaching the wing spar fitting to the body frame fitting with the set of fasteners.

10. A method for assembling an aircraft, the method comprising:
    positioning a wing for the aircraft for attachment to a body of the aircraft, the wing having a first fitting connected to a first structural component of the wing and the body having a second fitting connected to a second structural component of the body, the second fitting forms a bottom portion of a structural member of the body such that the structural member does not abut the wing without the second fitting;
    raising the wing vertically to the body such that a first connection section of the first fitting is aligned to a second connection section of the second fitting; and
    attaching the first fitting to the second fitting with a set of fasteners after the wing is in position with respect to the body without penetrating any sealed boundaries for a number of fuel tanks in the wing and a pressurized area in the body, the first fitting and the second fitting forming a mechanical joint connecting the wing to the body, and the fasteners vertically connecting the first fitting directly to the second fitting, the set of fasteners passing through only the first fitting and the second fitting.

11. The method of claim 10, wherein the first structural component is a body frame and the second structural component is a wing spar.

12. An apparatus for attaching a wing to a body of an aircraft comprising:
    a body fitting having a first structural section and a first connection section, the first structural section being designed to be attached to a frame in the body and forming a bottom portion of a body bulkhead member such that the body bulkhead member does not abut the wing without the body fitting, and the first connection section located at the bottom end of the first structural section and having a first set of holes; and
    a wing fitting having a second structural section and a second connection section, the second structural section being designed to be attached to a wing spar of the wing and, and the second connection section located at the top end of the second structural section and having a second set of holes that can be aligned to the first set of holes of the first connection section; and
    a first set of fasteners that fasten the wing fitting directly to the body fitting without penetrating any sealed boundaries for a number of fuel tanks in the wing and a pressurized area in the body, the set of fasteners being placed through only the first and second sets of holes vertically when the wing is vertically raised to the body with the first and second sets of holes being aligned to each other, the wing fitting and the body fitting forming a mechanical joint.

13. The apparatus of claim 12, wherein the first structural section of the body fitting comprises:

a first inner component that is placed on an interior surface of a body panel, wherein the first inner component is attached to the frame in the body to form the bottom portion of the body bulkhead member and provide structural support for the body; and a first outer component that is placed on an exterior surface of the body panel, wherein the first inner component is connected to the first outer component with a second set of fasteners prior to attaching the wing to the body.

14. The apparatus of claim 13, wherein the wing fitting further comprises:

a second inner component that is placed on the interior surface of a body panel, wherein a top portion of the second inner component is fastened to a bottom portion of a first inner component; and a second outer component that is placed on the exterior surface on the body panel, wherein a top portion of the second outer component is fastened to a bottom portion of the first outer component.

15. The apparatus of claim 14, wherein the second outer component comprises:

a surface with a contour that is substantially similar to an area on the exterior surface of the body panel where the second structural section is attached to the exterior surface;

a mid-section that extends from the surface in a direction that is about perpendicular to the surface; and a flange extending from an edge of the mid-section in a direction that is about perpendicular to the mid-section of the second outer component.

16. The apparatus of claim 13, wherein the first inner component of the first structural section comprises:

a surface with a contour that is substantially similar to an area on the interior surface of the body panel where the first structural section is attached to the interior surface;

a mid-section that extends from the surface in a direction that is about perpendicular to the surface; and a flange extending from an edge of the mid-section in a direction that is about perpendicular to the mid-section of the first inner component.

17. The apparatus of claim 12, wherein the wing fitting is made from one of aluminum, titanium, or a composite material.

18. The apparatus of claim 12, wherein the body fitting is made from one of is made from one of aluminum, titanium, or a composite material.

19. The apparatus of claim 12, wherein the frame of the aircraft is a body bulkhead frame, and wherein the first set of fasteners are a set of tension bolts.

20. The apparatus of claim 12, wherein the first structural section of the body fitting is integral to the frame.

* * * * *